(12) United States Patent
Douglas et al.

(10) Patent No.: US 10,509,834 B2
(45) Date of Patent: Dec. 17, 2019

(54) FEDERATED SEARCH RESULTS SCORING

(71) Applicant: Apple Inc., Cupertino, CA (US)

(72) Inventors: Jason Douglas, Cupertino, CA (US); Vipul Ved Prakash, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 14/871,947

(22) Filed: Sep. 30, 2015

(65) Prior Publication Data

US 2016/0357755 A1    Dec. 8, 2016

Related U.S. Application Data

(60) Provisional application No. 62/171,996, filed on Jun. 5, 2015.

(51) Int. Cl.
*G06F 7/00* (2006.01)
*G06F 17/30* (2006.01)
*G06F 16/9535* (2019.01)

(52) U.S. Cl.
CPC ............... *G06F 16/9535* (2019.01)

(58) Field of Classification Search
CPC .......... G06F 17/3053; G06F 17/30893; G06F 17/30566; G06F 17/3089; G06F 16/9535
See application file for complete search history.

(56) References Cited

U.S. PATENT DOCUMENTS

| | | | |
|---|---|---|---|
| 7,197,497 B2 | 3/2007 | Cossock | |
| 8,180,766 B2 | 5/2012 | Yang et al. | |
| 8,249,344 B2 | 8/2012 | Viola et al. | |
| 8,392,409 B1 | 3/2013 | Kashyap et al. | |
| 8,463,774 B1 * | 6/2013 | Buron | G06F 17/30861 707/724 |
| 8,538,989 B1 * | 9/2013 | Datar | G06F 17/30616 707/780 |
| 8,600,979 B2 | 12/2013 | Kim et al. | |
| 8,601,023 B2 | 12/2013 | Brave et al. | |
| 8,656,265 B1 | 2/2014 | Paulin et al. | |
| 8,799,358 B2 | 8/2014 | Lingley | |
| 8,995,815 B2 | 3/2015 | Maharajh et al. | |
| 8,996,520 B2 | 3/2015 | Chang et al. | |
| 9,001,821 B1 | 4/2015 | Chang et al. | |

(Continued)

OTHER PUBLICATIONS

PCT Invitation to Pay Additional Fees and, Where Applicable, Protest Fee, for PCT/US2016/028474, dated Jul. 13, 2016.

(Continued)

*Primary Examiner* — Hasanul Mobin
(74) *Attorney, Agent, or Firm* — Womble Bond Dickinson (US) LLP

(57) ABSTRACT

A method and apparatus of a device that ranks a plurality of query results from a plurality of search domains is described. In this embodiment, the device receives a query from a client. In addition, the device applies the query to the plurality of search domains and a broad-base search domain. Furthermore, the device receives the plurality of query results from the plurality of search domains and a set of broad-base query results from the broad-base search domain. The device additionally ranks the plurality of query results using the set of broad-base query results and returns a ranked plurality of query results to the client.

14 Claims, 19 Drawing Sheets

(56) References Cited

U.S. PATENT DOCUMENTS

| | | | |
|---|---|---|---|
| 2002/0184333 A1 | 12/2002 | Appelman | |
| 2004/0215606 A1 | 10/2004 | Cossock | |
| 2004/0267700 A1 | 12/2004 | Dumais et al. | |
| 2005/0165777 A1* | 7/2005 | Hurst-Hiller | G06F 17/30545 |
| 2006/0195428 A1 | 8/2006 | Peckover | |
| 2007/0179646 A1 | 8/2007 | Dempski | |
| 2009/0006431 A1* | 1/2009 | Agrawal | G06F 16/217 |
| 2009/0125498 A1 | 8/2009 | Cao et al. | |
| 2010/0063878 A1* | 3/2010 | Bachet | G06Q 30/0251 705/14.49 |
| 2010/0070486 A1* | 3/2010 | Punaganti Venkata | G06F 16/248 707/722 |
| 2010/0082582 A1* | 4/2010 | Gao | G06F 17/30867 707/706 |
| 2010/0174730 A1* | 7/2010 | Leung | G06F 16/2457 707/758 |
| 2010/0274783 A1 | 10/2010 | Chevalier et al. | |
| 2010/0306213 A1* | 12/2010 | Taylor | G06F 17/30867 707/759 |
| 2011/0087673 A1* | 4/2011 | Chen | G06F 16/951 707/748 |
| 2011/0288931 A1 | 11/2011 | Kuhn | |
| 2011/0314007 A1 | 12/2011 | Dassa et al. | |
| 2012/0023097 A1 | 1/2012 | LeBeau et al. | |
| 2012/0084644 A1 | 4/2012 | Robert et al. | |
| 2012/0102018 A1* | 4/2012 | Yang | G06F 16/3347 707/709 |
| 2012/0179955 A1 | 7/2012 | French et al. | |
| 2012/0233181 A1* | 9/2012 | Shehata | G06F 16/951 707/748 |
| 2012/0271806 A1* | 10/2012 | Ieong | G06F 16/9535 707/706 |
| 2013/0110815 A1 | 5/2013 | Tankovich et al. | |
| 2013/0110860 A1 | 5/2013 | Taranov et al. | |
| 2013/0111328 A1* | 5/2013 | Khanna | G06F 16/958 715/234 |
| 2013/0124534 A1* | 5/2013 | Dinh | G06F 17/30696 707/748 |
| 2013/0232128 A1 | 9/2013 | Krishnan et al. | |
| 2013/0262107 A1* | 10/2013 | Bernard | G06F 17/2785 704/235 |
| 2013/0332442 A1 | 12/2013 | Liu et al. | |
| 2014/0059042 A1 | 2/2014 | Vinay et al. | |
| 2014/0100835 A1 | 4/2014 | Majumdar et al. | |
| 2014/0105488 A1* | 4/2014 | Geng | G06F 16/951 382/161 |
| 2014/0195474 A1 | 7/2014 | Anguera Miró | |
| 2014/0229462 A1 | 8/2014 | Lo et al. | |
| 2014/0236919 A1 | 8/2014 | Liu et al. | |
| 2014/0282178 A1 | 9/2014 | Borzello | |
| 2014/0316890 A1 | 10/2014 | Kagan | |
| 2014/0324813 A1* | 10/2014 | Mathur | G06F 17/3053 707/707 |
| 2014/0358970 A1 | 12/2014 | Morris et al. | |
| 2014/0359519 A1 | 12/2014 | Luu et al. | |
| 2015/0046424 A1 | 2/2015 | Lin | |
| 2015/0112978 A1* | 4/2015 | Arora | H04L 61/609 707/724 |
| 2015/0317320 A1 | 11/2015 | Miller | |
| 2016/0094654 A1 | 3/2016 | Raman et al. | |

OTHER PUBLICATIONS

Wikipedia: "Google App Indexing: Google can Index & link to Content in Your Android App", Nov. 2, 2013.
Anonymous: "Breadcrumb (navigation)—Wikipedia, the free encyclopedia", Apr. 23, 2009.
Michael Sarlitt: "What is app deep linking and how it drives growth—Mike Sarlitt", Jun. 29, 2014.
International Search Report and the Written Opinion of the International Searching Authority, for corresponding International Application No. PCT/US16/028480, dated Jun. 17, 2016, 14 pages.
International Search Report and the Written Opinion of the International Searching Authority, for corresponding International Application No. PCT/US16/028483, dated Jun. 17, 2016, 12 pages.
International Search Report and the Written Opinion of the International Searching Authority, for corresponding International Application No. PCT/US16/028474, dated Oct. 28, 2016, 19 pages.
App Indexing for Google Search, https://web.archive.org/web, Nov. 11, 2013, 5 pages.
Wikipedia "Web Crawler", https://en.wikipedia.org/, May 16, 2015, 10 pgs.
Google, Add app deep links on your website, Mar. 3, 2015 5 pages.
Raj Hathiramani, How Many of the Top 200 Mobile Apps Use Deeplinks?, URX, Jul. 1, 2014, 7 pages.
Clarke, C.L.A., Cormack, G.V., and Tudhope, E.A., Relevance Ranking for One to Three Term Queries, Information Processing & Management 36, 2000, Elseiver Science Ltd., pp. 291-311.
Song, Rujhua et al., A Proximity Probabilistic Model for Information Retrieval, Microsoft Research, 2011, 8 pages.
Song, Rujhua, Ji-Rong Wen, and Wei-Ying Ma, Viewing Term Proximity Form a Different Perspective, Microsoft Research, 2005, 9 pages.
PCT Chapter I International Preliminary Report on Patentability (IPRP Chapter I) PCT/US2016/028480 dated Dec. 14, 2017. (11 Pages).
PCT Chapter I International Preliminary Report on Patentability (IPRP Chapter I) PCT/US2016/028474, dated Dec. 14, 2017 (12 Pages).
PCT Chapter I International Preliminary Report on Patentability (IPRP Chapter I) PCT/US2016/028483, dated Dec. 14, 2017 (9 Pages).
U.S. Appl. No. 14/871,900, filed Sep. 30, 2015, Final Rejection Mailed.
U.S. Appl. No. 15/056,697, filed Feb. 29, 2016, Non-Final Action Mailed.
U.S. Appl. No. 14/871,918, filed Sep. 30, 2015, Final Rejection Mailed.
U.S. Appl. No. 14/871,930, filed Sep. 30, 2015, Awaiting 1$^{st}$ Office Action.
U.S. Appl. No. 14/871,963, filed Sep. 30, 2015, Final Rejection Mailed.
Cristian Duda, Dianni Frey, Donald Kossmann, Chong Zhou, AJAXSearch: Crawling, Indexing and Searching Web 2.0 Applications, ETH Zurich Honghuan Univ., Aug. 2008, 4 pages.
Mada Seghete, How We Created Contextual Deep Links That Enable Your Apps to Function More Like the Web, Branch.io, Nov. 18, 2014, 7 pages.
Charity Majors, Smart Indexing at Parse, Parse, Apr. 1, 2014, 5 pgs.

* cited by examiner

FEDERATED SEARCH RESULTS SCORING

RELATED APPLICATIONS

Applicant claims the benefit of priority of prior, provisional application Ser. No. 62/171,996, filed Jun. 5, 2015, the entirety of which is incorporated by reference.

FIELD OF INVENTION

This invention relates generally to search technology and more particularly to indexing web pages with deep links, an improved proximity scoring function for query results, and an improved federated query result ranking method.

BACKGROUND OF THE INVENTION

A user will often perform a query search to lookup information on the Web or from other data sources. A query search begins with a client receiving the query string, which is sent to a search server. The search server receives query string and searches a search index for results that match this query string. The indices can include web pages or other objects available across a network, or can include information about objects located locally on the device (e.g., files, media, contacts, and/or other types of objects stored locally on the device). This search allows a user to determine which of the web pages that are accessed remotely or objects located locally on the device that match the query. Accessing one of these web pages or local objects will load the web page in a web browser.

Some web pages or other objects include deep links that are a reference to a location in an application, such as a location in a mobile application executing on mobile device. For example, the web site could be review-type web site that includes thousands or millions of reviews for business, services, and/or other sites of interest. In this example, one or more of the reviews hosted on the web site could include a deep link for that review. A deep link can allow a user to access content in a mobile application, where the mobile application would likely give a richer experience for this content than the user has when viewing the same content through a web browser. This is because the mobile application is developed to handle this content, where a web browser is a generally designed application.

SUMMARY OF THE DESCRIPTION

A method and apparatus of a device that performs a search using a deep link index is described. In an exemplary embodiment, the device receives a query on a device. The device additionally determines a plurality of results matching the query. The device further determines a subset of the plurality of results that correspond to at least one native application installed on the device. In addition, the device presents a link for each of the results in the subset of the plurality of results with data that launches the corresponding native application if that link is selected, where the link is a deep link that reference a location in the corresponding native application. Upon detecting one of the links corresponding to the subset of the plurality of results is selected, the device launches the corresponding native application with the data for that link.

In another embodiment, a device indexes deep links in a search index. In this embodiment, the device receives a set of seed objects. For each object in the set of seed objects, the device determines if the object includes a deep link, where the deep link references a location in an application. The device further adds the deep link to the search index. In addition, the device uses the search index to serve query, where the search index includes the indexed deep links.

In a further embodiment, a device returns a plurality of ranked query results for a query. In this embodiment, the device receives the query from a client. In addition, the device determines a plurality of query results matching the query. Furthermore, the device scores each of the plurality of query results using an order-based quadratic proximity function. The device additionally ranks the plurality of query results using the plurality of scores to determine the plurality of ranked query results. The device further sends the plurality of ranked query results to the client.

In yet another embodiment, a device ranks a plurality of query results from a plurality of search domains. In this embodiment, the device receives a query from a client. In addition, the device applies the query to the plurality of search domains and a broad-base search domain. Furthermore, the device receives the plurality of query results from the plurality of search domains and a set of broad-base query results from the broad-base search domain. The device additionally ranks the plurality of query results using the set of broad-base query results and returns a ranked plurality of query results to the client.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
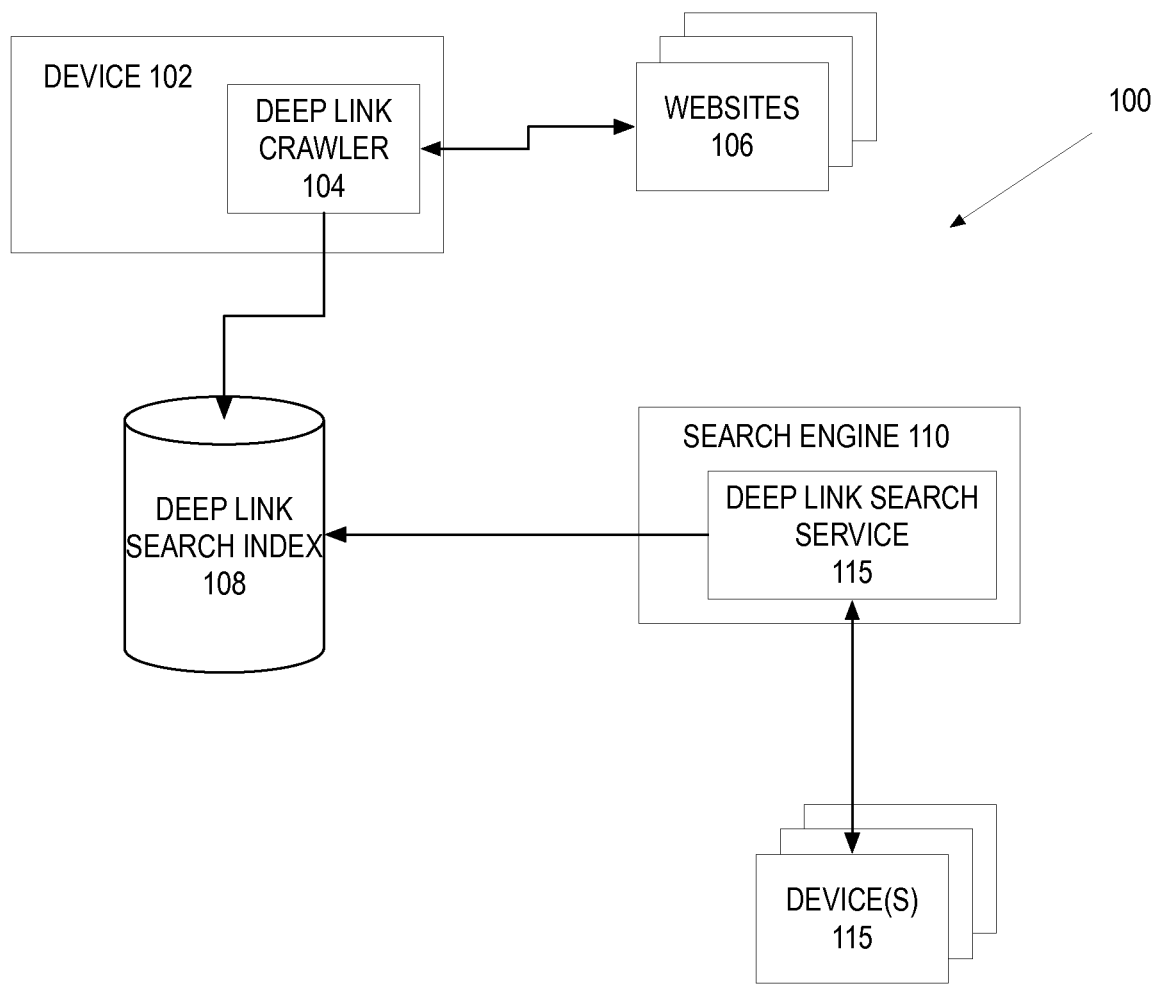
FIG. 1 is a block diagram of one embodiment of a system that indexes web pages with deep links for use in a search index and search service.

A method and apparatus of a device that performs a search using a deep link index is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a search using a deep link index is described. In one embodiment, the device crawls web sites and/or other objects accessible over a network to index deep links, where a deep link is a reference to a location within an application. In one embodiment, the device receives a set of seed objects that is used to start the crawling process. In this embodiment, the seed objects are web sites and/or other objects accessible over a network associated with applications that are submitted during an approval process for that application. For each object in the set of seed objects, the device retrieves the object and analyzes the object for deep links. If the object includes a deep link, the device indexes the deep link in a deep link index. In one embodiment, the device can index deep links supporting a variety of applications using different schema.

In one embodiment, with the deep link index, a search service can use this index to serve queries. In this embodiment, a device receives a query from a client and searches the deep link index to determine a set of results for the query. In one embodiment, the set of results includes a deep link as one of the results. The device sends the set of results back to the client. On the client, a user can select the deep link, where the corresponding application is launched and brings the application to location referenced by the deep link.

The set of results received by the client is a ranked set of results, where some results are ranked higher than others. In one embodiment, a device scores each of the results using a proximity scoring function. In this embodiment, the proximity scoring function scores each results (e.g. web page or other object accessible through a network) based on the distance and ordering between terms in the query. A match for query can include a span of terms that include terms not found in the query and can have the query terms in order or out of order. In one embodiment, the proximity scoring function is a blend between a span frequency function $(1/(1+x))$, where x is the distance between the matching terms, and an in-order quadratic weighted function $(1/(x^2+\alpha)$.

In a further embodiment, a device performs a query search using a federated search that performs the query search using multiple different search indices. In this embodiment, the device receives a query from a client and performs a query search using multiple search indices and a broad-base search index. The multiple search indices can include specialized search indices, such as maps, online encyclopedia, media, sites, and/or other types of specialized search index that are used to search specialized search domains. The broad-base search index is an index covers a number of different types of search domains. The device receives a first set of results from the multiple search indices and a second set of results from the broad-base search index. Each of the results in the second set of results is scored and the second set of results is ranked. In one embodiment, the device determines a search domain type for each of the results in the second set of results. Using the domain types and the results scores for the second set of results, the device determines which of the search domains are ranked higher in the second set of results. The device additionally uses this determination to increase a ranking score of results in the first set of results from search domain that are higher ranked and decrease results for the first set of results that are lower ranked. For example and in one embodiment, if for a query, the broad-base search domain returns and ranks results for movies higher than other results, the device would boost the scores of the results from the media search domain.

FIG. 1 is a block diagram of one embodiment of a system 100 that indexes web pages with deep links states for use in a search index and search service. In one embodiment, the system includes device 102 that is coupled to websites 106 and a deep link search index 108. Furthermore, the deep link search index 108 is coupled to a search engine 110 that includes a deep link search service 112. In one embodiment, the deep link crawler 104 crawls the website 106 (and possibly other objects accessible via a network, such as files, media, and/or other objects) for deep links. In this embodiment, a deep link is a link that references a location in an application, such as a mobile application. In addition, the deep link search service 112 receives queries from the device(s) 114 and performs a query search using the deep link search index 108.

Figure 2:
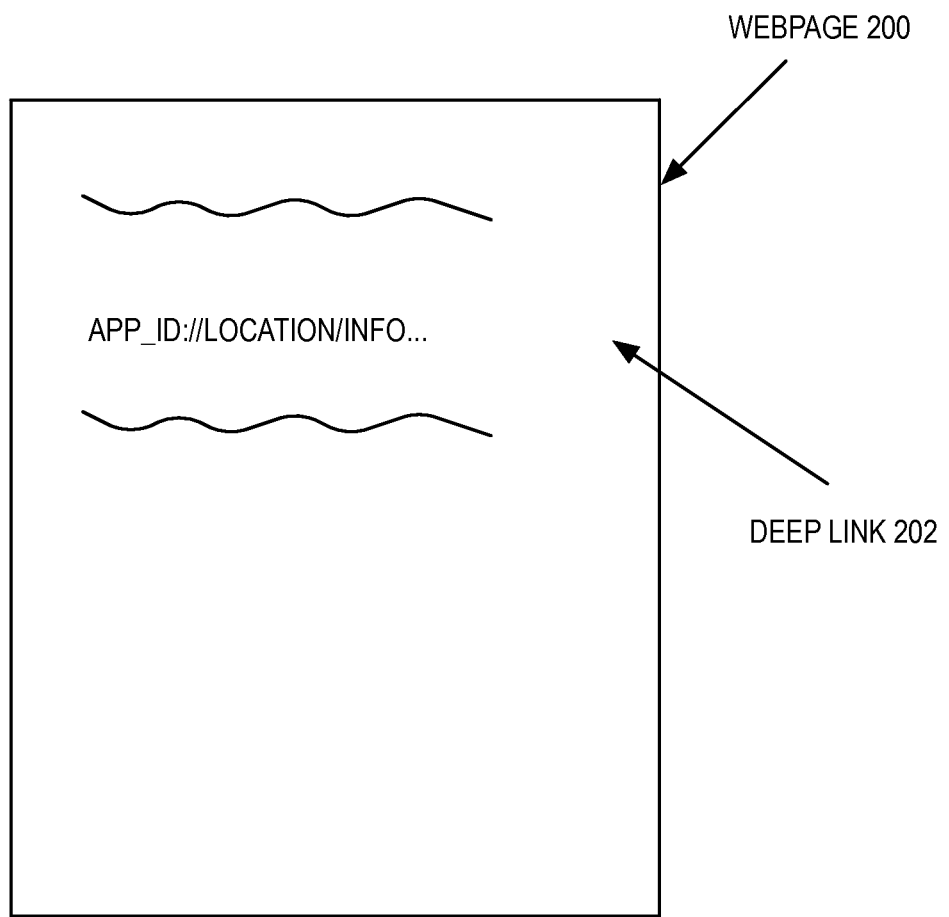
FIG. 2 is an illustration of one embodiment of a web page with a deep link.

FIG. 2 is an illustration of one embodiment of a web page 200 with a deep link 202. In FIG. 2, the web page includes a deep link 202 that references a location in an application. In one embodiment, the deep link 202 has the format:

app_id://location/info        (1)

In this embodiment, the deep link 202 is a Uniform Resource Identifier (URI), where the app_id is the application identifier, location is a location within the application, and info is further information that is used by the application to identify the location within the application. In one embodiment, the application identifier is known as a schema. There are many different kinds of application identifiers that are possible, such application identifiers for Twitter, YouTube, eBay, Netflix, Quora, Starbucks, Pinterest, Yelp, Etsy, and other applications. A problem, however, is that each application has their own format for the deep link. For example and in one embodiment, a Twitter deep link is "twitter://location/ . . . " and a YouTube deep link is "youtube://location/ . . . ". Instead of letting the user understand or determine how to use the deep link, the deep link crawler as described in FIG. 1, crawls the web or other objects to index the discovered deep links.

Returning to FIG. 1, the deep link crawler 104 crawls the websites 106 and/or other objects, referred to as an object, accessible via a network to discover content that is referenced by a deep link. In one embodiment, for each object accessed by the deep link crawler 104, the deep link crawler 104 analyzes the object to determine if that object includes one or more deep links. If the object includes a deep link, the deep link crawler 104 indexes the deep link. In one embodiment, the deep link crawler 104 indexes the deep link by storing the application identifier and the deep link (e.g., the URL for the deep link). Indexing the deep link is further described in FIG. 3 below.

Furthermore, and in one embodiment, a search engine 110 includes a deep link search service 114. In this embodiment, the deep link search service 114 receives a query from one of the devices 114 and performs a query search using the received query with the deep link search index. The deep link search service 114 gathers a set of results that includes one of more deep links and returns the set of results to the device 114. Performing a search query using the deep link index 108 is further described in FIG. 4 below.

Figure 3:
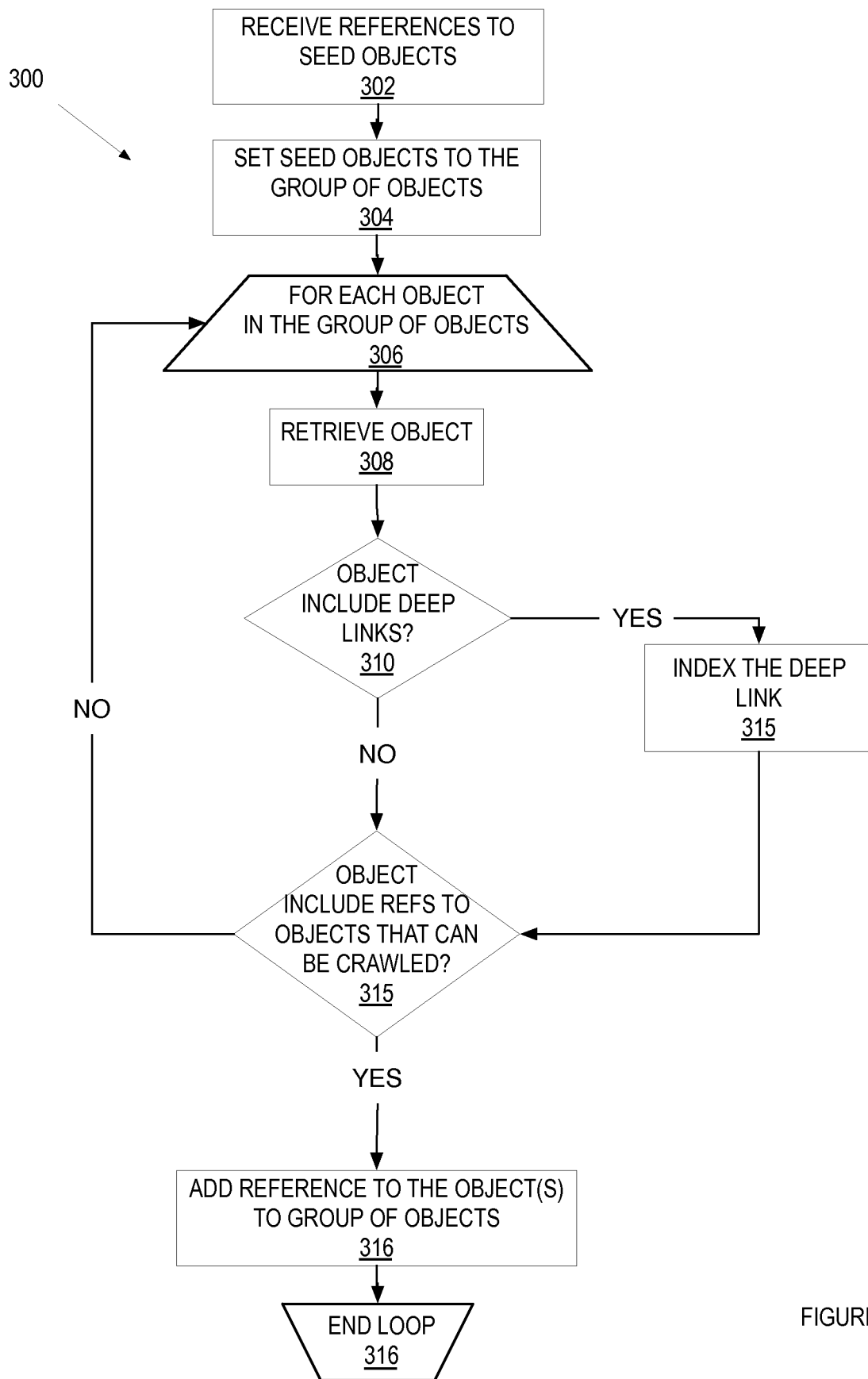
FIG. 3 is a flow diagram of one embodiment of a process to index deep links from multiple deep links.

FIG. 3 is a flow diagram of one embodiment of a process 300 to index deep links from multiple deep links. In one embodiment, process 300 is performed by a deep link crawler that index deep links from multiple deep links, such as the deep link crawler 104 as described above in FIG. 1. In FIG. 3, process 300 begins by receiving a set of seed objects at block 302. In one embodiment, the set of seed objects is a set of references to objects accessible by a network. In this embodiment, the seed objects are web sites and/or other objects accessible over a network associated with applications that are submitted during an approval process for that application. Process 300 uses the set of seed objects to start the crawling. In one embodiment, the one of the seed objects is a web page. At block 304, process 300 sets the set of seed objects as the group of objects, where the group of objects is the object group that process 300 uses to search for deep links.

Process 300 executes a programming loop (blocks 306-318) to analyze each object in the group of objects for deep links. At block 308, process 300 retrieves the object. Process 300 determines if the object includes a deep link at block 310. In one embodiment, the object is a web page and the deep link is a reference to a location in an application. In one embodiment, the deep link is the deep link as described in FIG. 2 above. If the object does not have any deep links, execution proceeds to block 312 below. If the object does include one or more deep links, process 300 indexes each of the deep links at block 314. In one embodiment, process 300 adds each of the deep links from the object into the deep link index. In this embodiment, process 300 extracts metadata for the deep link and adds this metadata to the deep link index for this deep link. For example and in one embodiment, process 300 extracts metadata from metadata stored in an schema.org structured markup. In a further embodiment, process 300 can index deep links for different applications and/or using different schema. For example and in one embodiment, process 300 indexes deep links for Twitter, YouTube, eBay, Netflix, Quora, Starbucks, Pinterest, Yelp, Etsy, and other applications, where each of these applications have a different schema. For example and in one embodiment, a Twitter deep link is "twitter://location/ . . . " and a YouTube deep link is "youtube://location/ . . . ". In this example, "twitter:" and "youtube:" schema, which process 300 indexes. Process 300 further indexes the deep links for other applications that have different schema by maintaining an association between a schema and the relevant application.

By building the deep link index, process 300 is building an index for content inside the application that corresponds to the deep link. For example, if the object is a review of a business in a web page for a review web site and this web page includes a deep link to an application corresponding to the web site, process 300 indexes this deep link for the review of the business in this application. At block 312, process 300 determines if this object includes references to other objects than can be crawled. In one embodiment, a reference to another object is a uniform resource locator (URL) to another web page, file, or other object accessible by a URL. If the object does not include references to other objects, execution proceeds to block 306 above. If the object does include references to other objects that can be crawled, process 300 adds the references to these objects in the group of objects. The processing loop ends at block 318.

Figure 4:
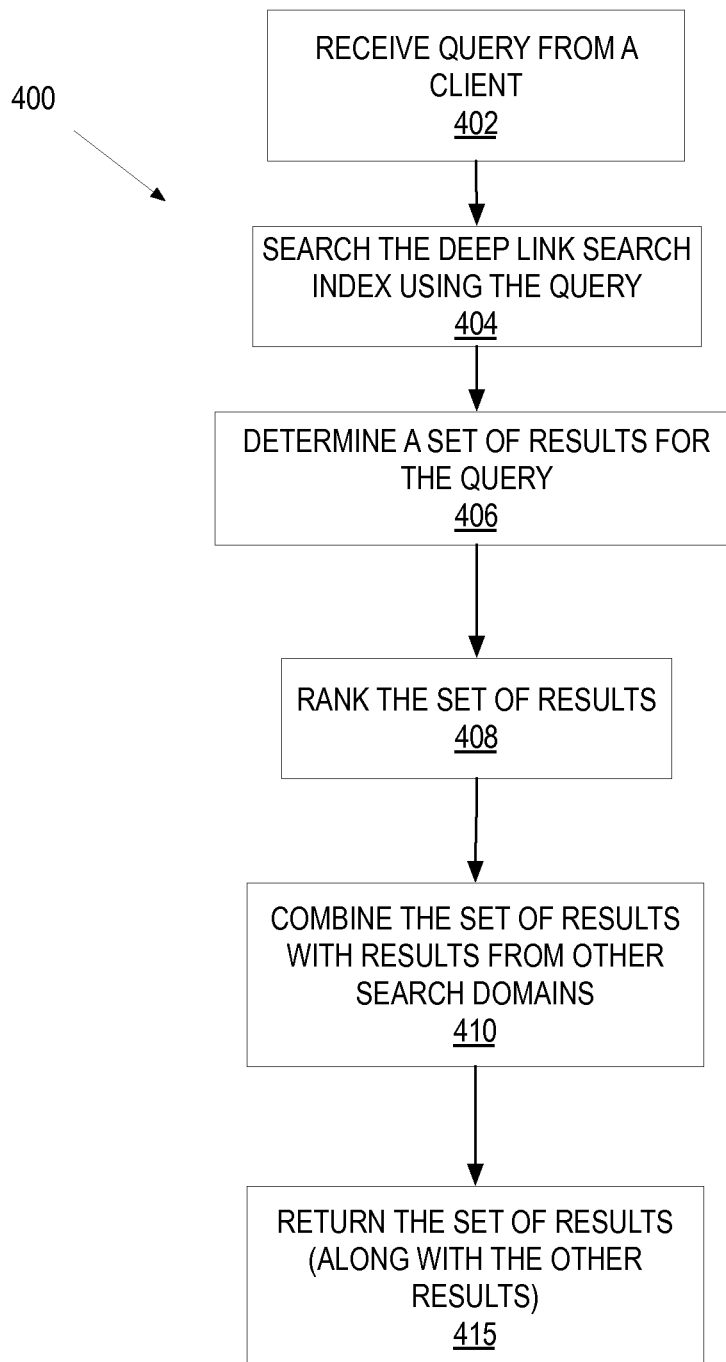
FIG. 4 is a flow diagram of one embodiment of a process to perform a query search using a deep link index.

FIG. 4 is a flow diagram of one embodiment of a process 400 to perform a query search using a deep link index. In one embodiment, process 400 is performed by a remote application state search service to perform a query search using a deep link search service, such as the deep link search service 112 as described above in FIG. 1. In FIG. 4, process 400 begins by receiving a query from a client at block 402. In one embodiment, a query is a search string that is input by user in an application and sent to the search service as described above. At block 404, process 400 searches the deep link search index using the query. In one embodiment, process 400 determines if there are any deep links that match the query. Process 400 determines a set of results for the query at block of 406. In one embodiment, the set of results includes one or more deep links that match some or all of the text in the query. At block 408, process 400 ranks the set of results. In one embodiment, process 400 ranks the set of results by determining the score for each of the results and ranking these results using those scores. At block 410, process 400 combines a set of results with results from other search domains. In one embodiment, if the search is a federated search, where the same query is used to search different indices, process 400 combines results from other search domains with the set of results determined using the application state index. For example and in one embodiment, the query may be used to search the deep link search index, a general web search index, and/or different indices (e.g., media index, application store index, maps index, online encyclopedia index, and/or another type of index). At block 412, process 400 returns a set of ranked results, along with the other results generated in block 410, to the client.

Figure 5:
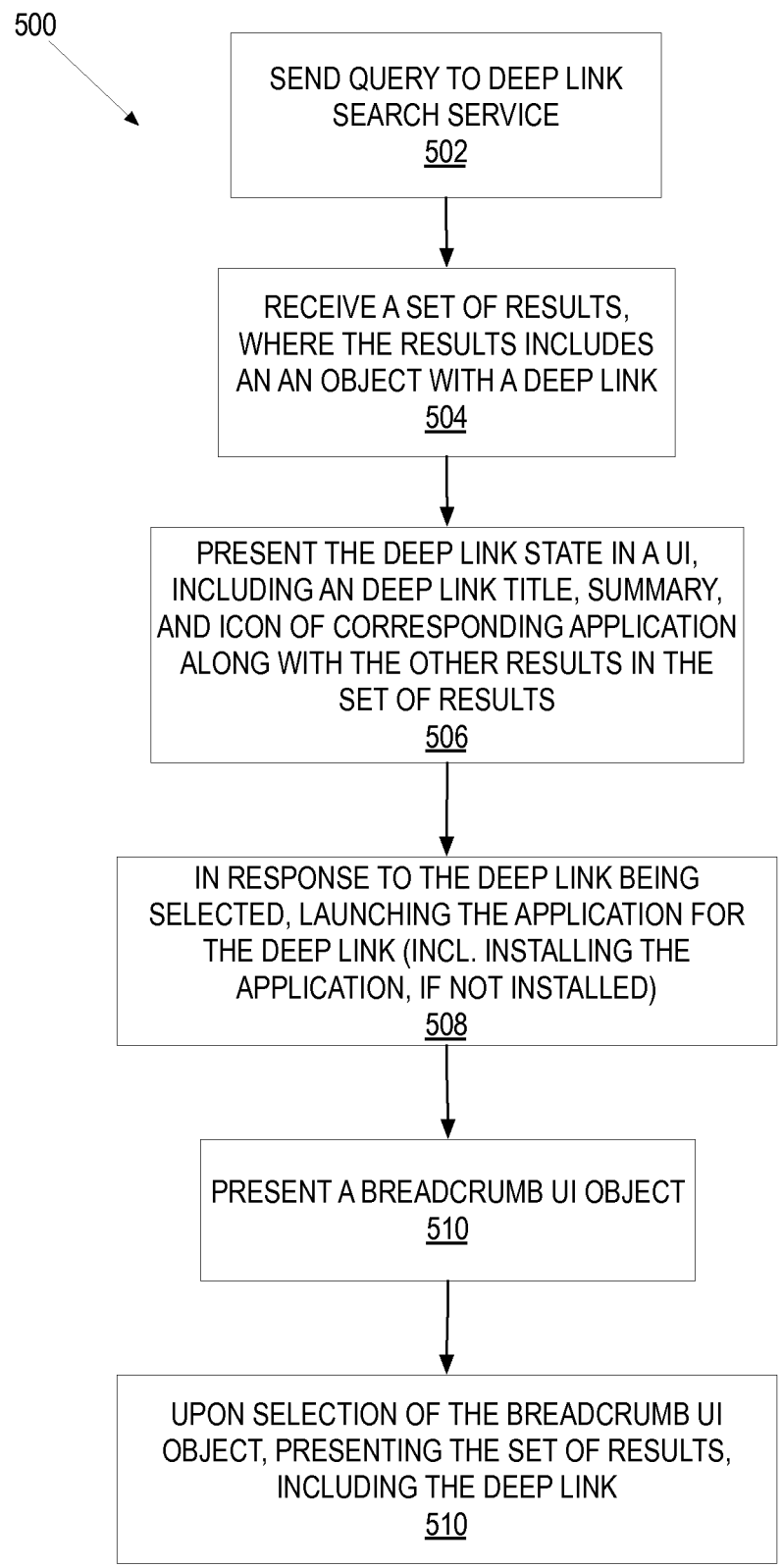
FIG. 5 is a flow diagram of one embodiment of a process to receive and present a deep link as part of a query result.

FIG. 5 is a flow diagram of one embodiment of a process 500 to receive and present a deep link as part of a query result. In one embodiment, process 500 is performed by a device to receive and present an application state as part of the query result, such as one of the devices 114 described in FIG. 1 above. In FIG. 5, process 500 begins by sending a query to a deep link search service at block 502. In one embodiment, the query can be a search string that is input by user in the application and sent to the search service. In this embodiment, the input can be entered by text, spoken word, automatically generated, received from a coupled device (e.g., a smart watch coupled to a portable device), and/or some other way to enter a search string. At block 504, process 500 receives a set of results, where the results include a deep link. In one embodiment, the set of results are ranked with the top-ranked result being a top hit. At block 506, process 500 presents the deep link in a user interface. In this embodiment, the deep link includes a deep link title, summary, and an indication of an icon corresponding to the application for this deep link. In response to the deep link being selected, process 500 launches the corresponding application using the selected deep link. In one embodiment, because the deep link is a location within an application, the launched application presents the user with the application at this application location. For example and in one embodiment, if the deep link is a review of a local restaurant for a review type application, process 500 launches the review type application with the local restaurant location within the application. In this example, the review type application would be launched such that the user interface presented to the user is the one of the local restaurant in the review type application. In one embodiment, if the application is not installed on the device, process 500 can download the application from a remote source, such as an application store, webpage, or other remote server. In this embodiment, process 500 would install the application and launch the application using the selected deep link.

In one embodiment, in addition to launching the application, process 500 presents a breadcrumb user interface object that indicates to the user how to return to the set of results displayed at block 506. At block 510, process 500 presents a breadcrumb user interface object. In one embodiment, the breadcrumb user interface object is a banner that is adjacent to the user interface for the launched application. In one embodiment, the breadcrumb user interface object is above the launched application user interface. The breadcrumb user interface object indicates to the user that the user can return to the set of results from the application. In one embodiment, the breadcrumb user interface object is presented by the operating system of the device, which means that an application does not need to be modified in order to return to the set of results. Process 500 returns to the presentation of the set of results (including the deep link) upon selection of the breadcrumb user interface object at block 512.

Figure 6:
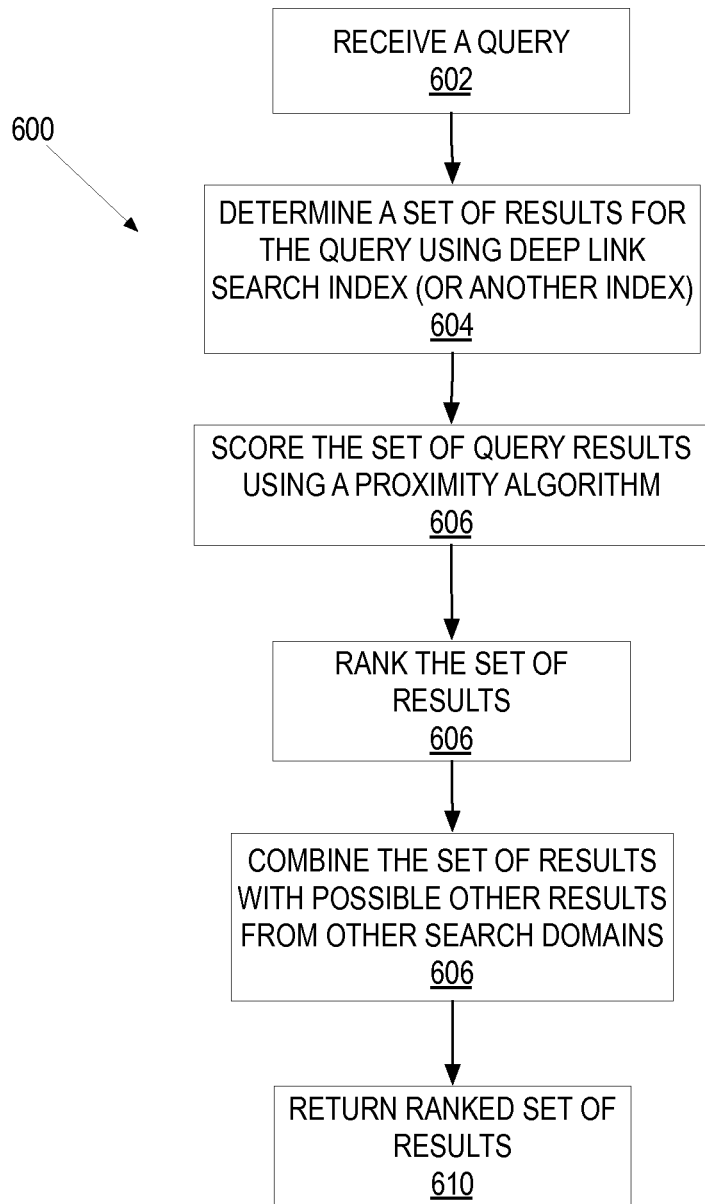
FIG. 6 is a flow diagram of one embodiment of a process to perform a query search using a proximity scoring function.

As described above, a search service (e.g., the deep link search service 112) scores each result in a set of results for a query search to determine how these results should be ranked. In one embodiment, a search service ranks results that are scored higher as being more relevant and lower scored results as being less relevant for the query. FIG. 6 is a flow diagram of one embodiment of a process 600 to perform a query search using a proximity scoring function. In one embodiment, search engine performs process 600, such as the deep link search service 112 as described in FIG. 1 above. In another embodiment, a different type of search service can perform process 600 (e.g., a general web search service, a specialized search service, and/or another type of search service). In FIG. 6, process 600 begins by receiving a query from a client at block 602. In one embodiment, a query is a search string that is input by user in the application and sent to the search service as described above. At block 604, process 600 searches the deep link index using the query. In one embodiment, process 600 determines if there are any deep links that match the query and determines a set of results for the query. In another embodiment, process 600 searches another search index using this query (e.g., general web search index, and/or a different search index). In one embodiment, the set of results includes one or more deep links or other objects (e.g., web pages, etc.) that match some or all of the text in the query. In another embodiment, the set of results may not include a deep link.

At block 606, process 600 scores the set of results using a proximity-scoring function. While in one embodiment, process 600 scores the sets results using the proximity-scoring function, in alternate embodiments, the set of results are scored using one or more additional functions. For example and in one embodiment, the set of results can be scores using a zone boost. In one embodiment, the proximity scoring function scores the result where each results includes two or more terms from a query that are within a specified distance. In one embodiment, a term is a word, phrase, or another language construct. In one embodiment, the distance between the terms can be characters or words and is used to constrain the matching of the terms for a result. In another embodiment, the proximity-scoring function imposes an order on the result. For example and in one embodiment, a query that is "white truck" would score the result higher for strings "white Ford truck," "white slightly used truck," but score lower "truck with white paint" (out of order) and "white house that includes a lawn with a truck" (longer distance between words). In one embodiment, the proximity of the terms in a document implies a relationship between the terms. In this embodiment, creators of object being searched may try to formulate sentences that contain a single idea, or cluster of related ideas within neighboring sentences or organized into paragraphs. Thus, there may be an inherent or relatively high probability within this object structure that terms used together or in close proximity are related. On the other hand, when two words are on the opposite ends of a document or web page, the probability of a relationship between the words is relatively weak. By ranking results where the words are within the specified maximum proximity, or distance, the results are assumed to be of higher relevance than the results where the words are scattered. The proximity scoring is further described in FIG. 7 below.

At block 608, process 600 ranks the set of results using the result scores determined above. At block 610, process 600 combines a set of results with results from other search domains. In one embodiment, if the search is a federated search, where the same query is used to search different indices, process 600 combines results from other search domains with the set of results determined using the application state index. For example and in one embodiment, the query may be used to search the application state index, a general web search index, and/or different indices (e.g., media index, application store index, maps index, online encyclopedia index, and/or another type of index). At block 612, process 600 returns a set of ranked results, along with the other results generated in block 610, to the client.

Figure 7:
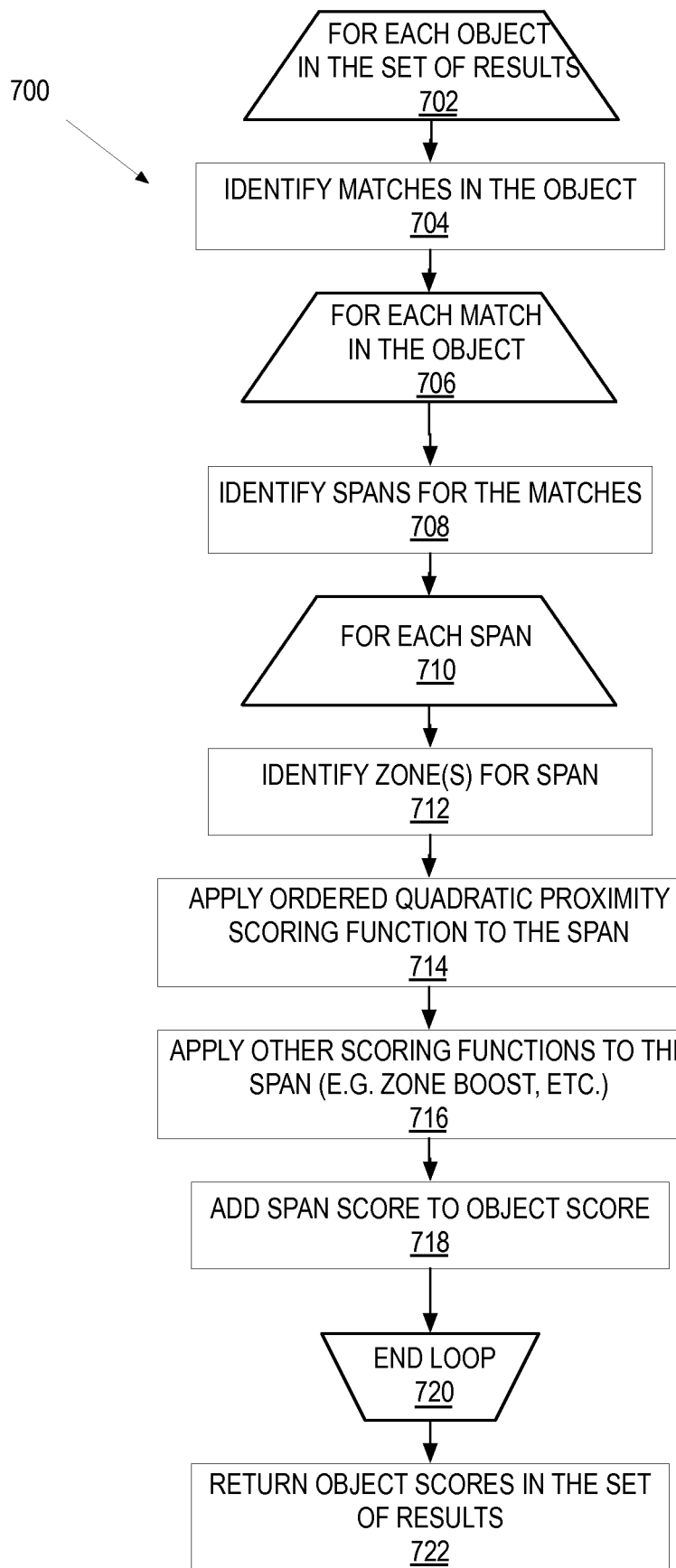
FIG. 7 is a flow diagram of one embodiment of a process to score an object using an ordered quadratic proximity function.

FIG. 7 is a flow diagram of one embodiment of a process 700 to score an object using an ordered quadratic proximity function. In one embodiment, process 600 performs process 700 to score an object using an ordered quadratic proximity function. In FIG. 7, process 700 begins by performing a processing loop (blocks 702-718) for each object in the set of results to score that object using the proximity function. At block 704, process 700 identifies the matches in the object. In one embodiment, process 700 identifies a match by identifying the terms of the query in the object.

For each match in the object, process 700 performs a processing loop (blocks 706-718) to score each match in the object. At block 708, process 700 identifies the spans in the zone matching the query. In one embodiment, a span is a set of terms that include the terms from the query with zero or more additional terms. A span can include the query terms in order or out-of-order. For example and in one embodiment, if the query is "TripAdvisor Bardessono," a span matching this query could be "TripAdvisor—Bardessono," or "Bardessono, rated 4.5 out of 5 on TripAdvisor." In one embodiment, there are can be different types of matches. If the query is "TripAdvisor Bardessono," an exact match for one of the terms can be "TripAdvisor" in the application name field, a prefix match of "TripAdvisor LLC" in the develop name field, an in-order match in the title field of "TripAdvisor—Bardessono," and out-of order match in the body field for the span "Bardessono, rated 4.5 out of 5 on TripAdvisor."

Process 700 further performs another processing loop (blocks 710-718) to score each span. At block 712, process 700 identifies the zones for the span. In one embodiment, a zone is segment of an object. In one embodiment, instead of analyzing and scoring each field of an object (e.g., application name, developer, title, description, keywords, headers (e.g., H1, H2, and/or H3), body, caption, and/or other fields of the object), the fields are collapsed into a smaller set of zones. For example and in one embodiment, process 700 collapses the application name, developer, and title fields into zone 1; description, keywords, and a top-level header into zone 2; the two next level headers into zone 3; and body and caption into zone 4. In this embodiment, collapsing the fields into zones reduces over-fitting and model complexity and significantly improves performance. For example and in one embodiment, applying zoned ranking to an 80-field index can give a speed increase from 103 ms to 1.35 ms.

At block 714, process 700 applies an ordered quadratic proximity scoring function to the span. In one embodiment, the ordered quadratic proximity scoring function scores spans that have in-order matches higher than out-of-order matches for the query terms. In addition, the ordered quadratic proximity scoring function scores the span based on the distance squared between terms. For example and in one embodiment, for the query "TripAdvisor Bardessono," the span with the terms "TripAdvisor—Bardessono" will score higher because the distance between the query terms is small (one term) and the match is an in order match. In another example and embodiment, the span "TripAdvisor ranks the wine country hotel Bardessono" would score higher because the span is an in order match, but lower because the distance between the terms (five terms) is larger. As a further example and embodiment, the span "Bardessono, rated 4.5 out of 5 on TripAdvisor" is a lower scoring match because this is an out-of-order match and the distance is large (6-7 terms, depending if punctuation is counted as a separate term).

In one embodiment, the ordered quadratic scoring function is a blend between a span frequency function $(1/(1+x))$, where x is the distance between the matching terms, and an in-order quadratic weighted function $(1/(x^2+\alpha))$. In one embodiment, the ordered quadratic scoring function has the form as illustrated in Equation (1) below:

$$f = \frac{(1-b) + \left(\frac{b*\beta}{ord^2 + \alpha}\right)}{distance}$$

where b is a tuning parameter to weight the contribution for the span frequency function, a is a tuning parameter to tune the effect of the distance, $\beta$ is tuning parameter that tunes the effect of the order, ord is the order value, and distance is the distance between the terms. In one embodiment, the distance is the distance between the first and last term in the span. In one embodiment, a smaller $\beta$ value decreases the contribution of the in-order quadratic weighted function to the overall function score. In addition, $\beta$ has a value of 1 for in-order matches and a value less than one for out-of-order matches.

At block 714, process 700 other scoring functions to the span. In one embodiment, the additional scoring functions can be a zone boost, prefix boost, and exact match boost. In one embodiment, a match of the query terms in zone may be more relevant that a query match in another zone. For example and in one embodiment, a match of the query terms in the zone that includes the title or higher-level header may be given a zone boost because a match in this zone may indicate a more relevant match than a match in a zone that includes the body of the object. In one embodiment, a prefix boost is applied to contiguous matches of the query terms from beginning of a zone. In a further embodiment, an exact boost is applied to matches in a zone, if the matches entirely cover the zone. Process 700 adds the span score to the object score at block 716. In one embodiment, process 700 collects each spans score into an overall object score. The three processing loops end at block 718. At block 720, process 700 returns the object scores in the set of results.

Figure 8:
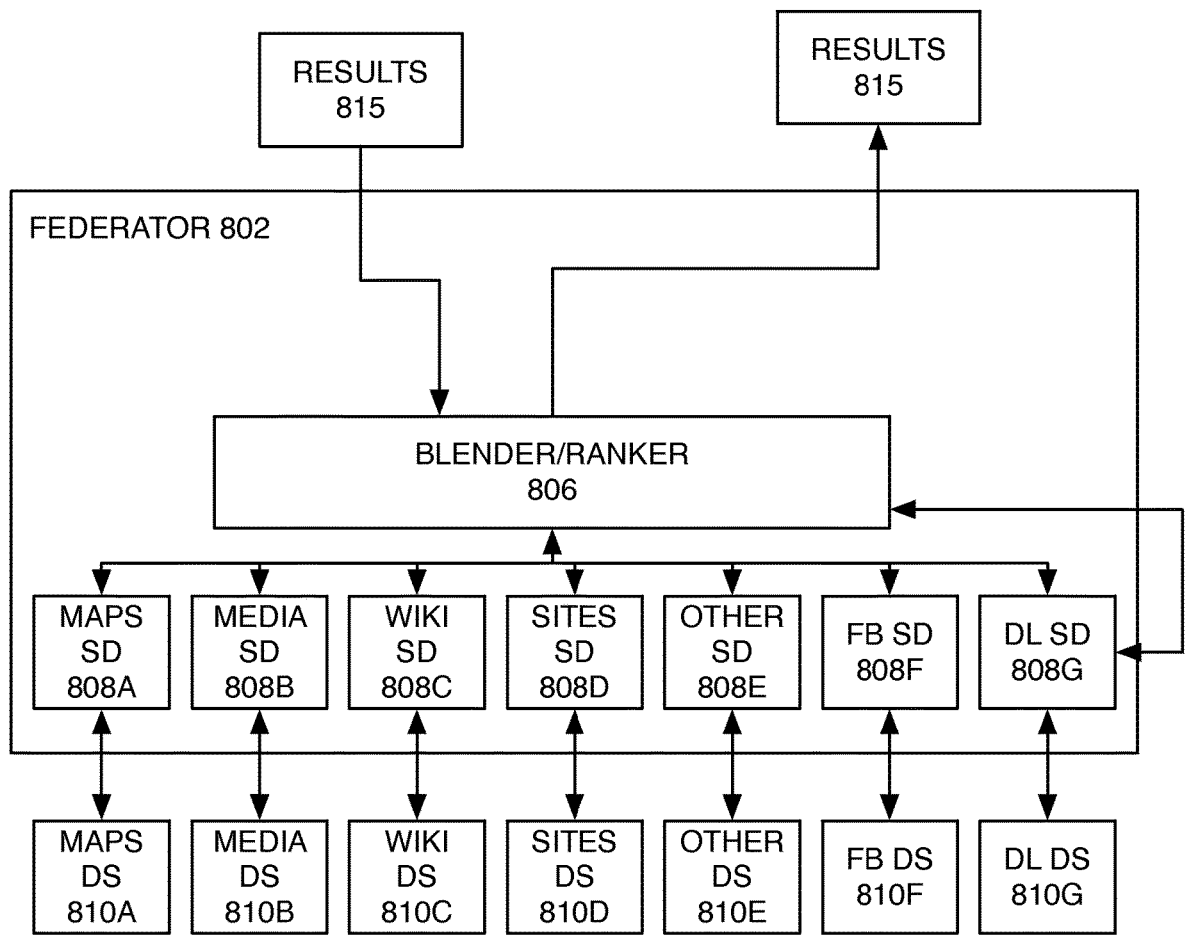
FIG. 8 is a block diagram of one embodiment of a federator that performs a multi-domain search using results from one search domain to rank results from other search domains.

In one embodiment, the deep link search index is a broad-base index that covers many different types of content. In this embodiment, what types of results and the scores for the these result that come for the deep link search index can be used to rank results from other search domains. FIG. 8 is a block diagram of one embodiment of a federator 802 that performs a multi-domain search using results from one search domain to rank results from other search domains. In one embodiment, the federator 802 includes a blender/ranker 806, and multiple search domains 808A-G. In one embodiment, the maps search domain 804A is a search domain that includes information related to a geographical map. In this embodiment, the maps information can include information about places, addresses, places, businesses, places of interest, or other type of information relating to maps. In another embodiment, the maps information can also include information related to places of interest, such as opening hours, reviews and ratings, contact information, directions, and/or photographs related to the place. The maps search domain 808A queries information from a maps data source 810A. In one embodiment, the media search domain 804B is a search domain related to media. In one embodiment, the media search domain 804B includes information related to music, books, video, classes, spoken word, podcasts, radio, and/or other types of media. In a further embodiment, the media search domain 804B can include information related to applications that can run on the device, such as device 102, smartphone 114 and tablet 116 as described above in FIG. 1. In one embodiment, the media search domain is a media store that includes different types of media available for purchase (e.g., music, books, video, classes, spoken word, podcasts, radio, applications, and/or other types of media). The media search domain 808B queries information from a media data source 810B.

In one embodiment, the wiki search domain 804C is an online encyclopedia search domain. For example and in one embodiment, wiki search domain 804C can be WIKIPEDIA. The wiki search domain 808C queries information from a wiki data source 810C. In one embodiment, the sites search domain 804D is a search domain of websites. For example and in one embodiment, the sites search domain 804D includes business, governmental, public, and/or private websites such as "apple.com," "whitehouse.gov," "yahoo.com," etc. The sites search domain 808D queries information from a sites data source 810D. In one embodiment, the other search domain 804E is a set of other search domains that can be accessed by the federator 802 (e.g., a news search domain). The other search domain 808E queries information from other data source(s) 810E. In one embodiment, the feedback completion domain 804F is a search index that is based on query feedback collected by browsers running on various devices. In one embodiment, the feedback completion domain 804F includes a feedback index that maps queries to results based on the collected query feedback. The feedback search domain 808 queries information from the feedback data source 810F (e.g., the feedback search index).

In a further embodiment, the deep link search domain 808G is search domain that include an index of objects with deep links. In one embodiment, the deep link search domain 808G includes the deep link search index 108 as described in FIG. 1 above. In one embodiment, the deep link search domain is a broad-base search domain in which the search domain covers many different types of possible results. For example and in one embodiment, the deep link search domain could includes results such as media results (e.g., movies, videos, music, books, and/or other types of media), locations (e.g., business, services, places of interest, and/or other types of locations), online encyclopedia entries (e.g.,), results of particular sites (e.g., sites that are also accessible by the sites 808D search domain), and/or other types of results (e.g., entries regarding persons, places, and/or things). In this example, the results may not be the same result found in the other search domains, but these results have a type that is associated with the other search domains.

In addition, the blender/ranker 806 receives the results from the multiple search domains 808A-G and ranks these results. In one embodiment, the blender/ranker 806 uses the types of results from the deep link search domain 808G to rank the results from the other search domains 808A-F. For example and in one embodiment, if for a query, the deep link search domain returns and ranks results for movies higher than other results, the blender/ranker 806 would boost the scores of the results from the media search domain 808B. As another example and embodiment, if for the query, the deep link search domain returns and ranks results for online encyclopedia entries higher than other results, the blender/ranker 806 would boost the scores of the results from the wiki search domain 808C. Using one search domain to rank results from other search domains is further described in the FIGS. 9 and 10 below.

Figure 9:
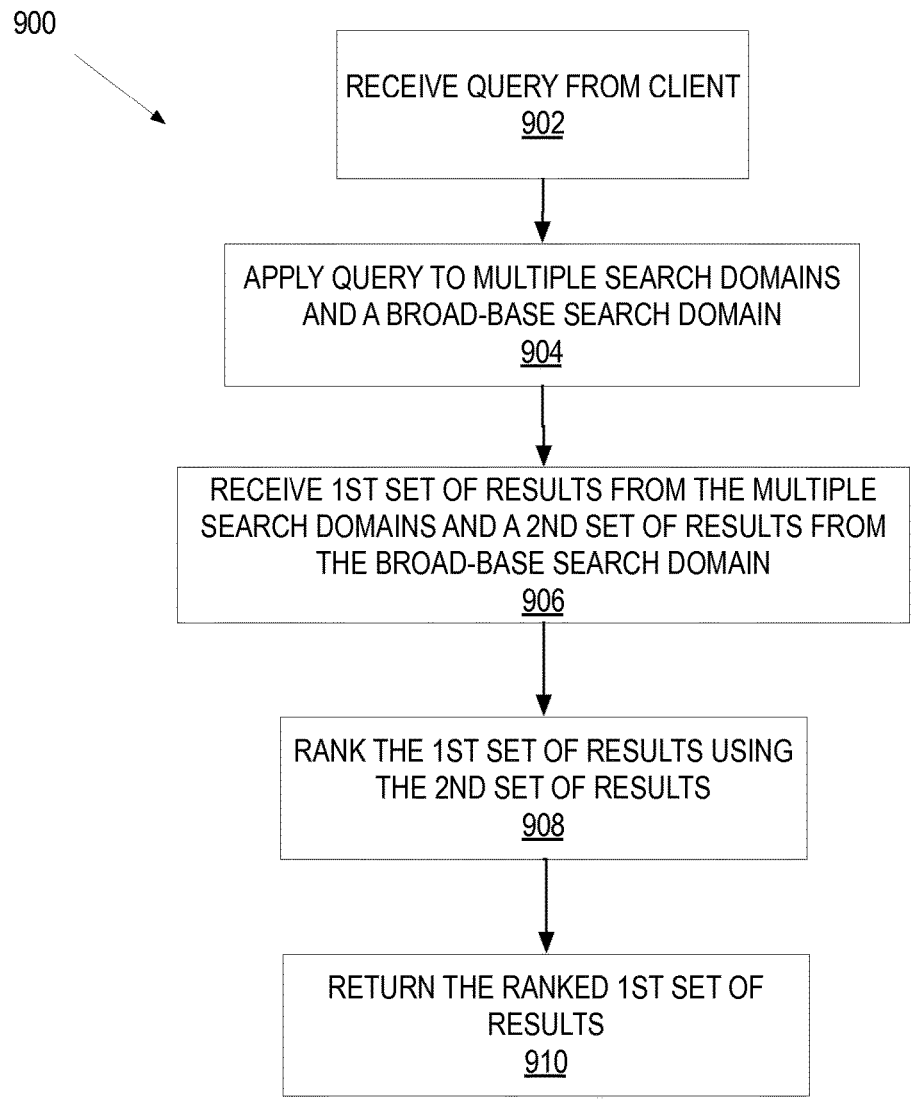
FIG. 9 is a flow diagram of one embodiment of a process to use query results from a broad-base search domain to ranks query results from other search domains.

FIG. 9 is a flow diagram of one embodiment of a process 900 to use query results from a broad-base search domain to rank query results from other search domains. In one embodiment, process 900 is performed by a blender/ranker to use query results from a broad-base search domain to rank query results from other search domains, such as the blender/ranker 806 as described above in FIG. 8. In FIG. 9, process 900 begins by receiving a query from a client at block 902. In one embodiment, the query can be a search string that is input by a user in an application and sent to the blender/ranker. In this embodiment, the input can be entered by text, spoken word, automatically generated, received from a coupled device (e.g., a smart watch coupled to a portable device), and/or some other way to enter a search string. At block 904, process 900 applies the query to multiple search domains and to a broad-base search domain. In one embodiment, process 900 sends the query to the maps, media, wiki, sites, and/or other search domains, where each of the search domains determines a set of results for the query, such as search domain 808A-F as described in FIG. 8 above. In addition, process 900 sends the query to a broad-base search domain, where the broad-base search domain covers many different types of possible results. In one embodiment, the broad-base search domain is the deep link search domain as described in FIG. 8 above. In another embodiment, the broad-base search domain is another search domain that covers many different types of possible results (e.g., feedback search domain, another general web page search domain, and/or other types of search domain).

At block 906, process 900 receives a first set of results from the multiple search domains and a second set of results from the broad-base search domain. In one embodiment, one or more of the search domains from the multiple search returns one or more results for the query. In addition, process 900 receives a second set of results from the broad-base domain, where the second set of results includes results that have types analogous to the types of results in the other search domains. For example and in one embodiment, the broad-base search domain includes results such as media results (e.g., movies, videos, music, books, and/or other types of media), locations (e.g., business, services, places of interest, and/or other types of locations), online encyclopedia entries (e.g., entries regarding persons, places, and/or things), results of particular sites (e.g., sites that are also accessible by the sites 808D search domain), and/or other types of results.

Process 900 ranks the first set of results using the second set of results at block 908. In one embodiment, process 900 determines the types of results for the second set of results. For example and in one embodiment, process 900 determines a search domain for each of the results in the second set of results. Process 900 further ranks the search domain types using the scores for the each of results in the second set of results. With the ranked search domain types, process 900 ranks the first set of results using the ranked search domain types. Ranking the first set of results using the second set of results is further described in FIG. 10 below. At block 910, process 900 returns the ranked first set of results. In one embodiment, process 900 returns the ranked first set of results to the client that sent the query.

Figure 10:
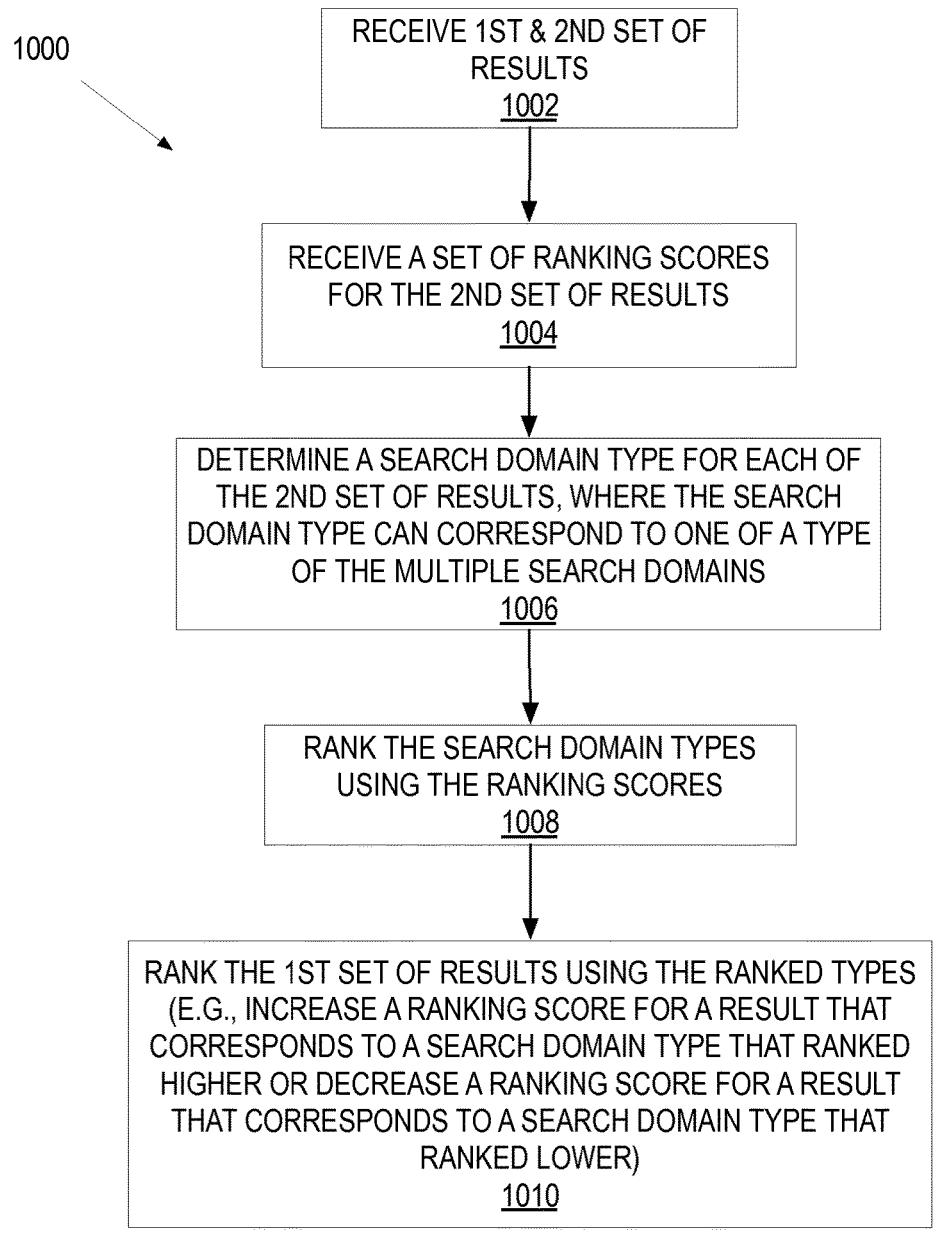
FIG. 10 is a flow chart of one embodiment of a process to rank types of broad-base search domain results and use the ranked broad-base types to rank results from other search domains.

As described above, process 900 ranks the first set of results using the second set of results. FIG. 10 is a flow chart of one embodiment of a process 1000 to rank types of broad-base search domain results and use the ranked broad-base types to rank results from other search domains. In one embodiment, process 900 performs process 1000 to rank types of broad-base search domain results and use the ranked broad-base types to rank results from other search domains. In FIG. 10, process 1000 begins by receiving the first and second set of results at block 1002. At block 1004, process 1000 receives a set of ranking scores for the second set of results. In one embodiment, the broad-base search domain scores the results in the second set of results to generate the ranking set of scores. In another embodiment, the ranking scores are generated by the broad-base search domain and further adjusted by the blender/ranker.

At block 1006, process 1000 determines a search domain type for each of the second set of results. In one embodiment, each of the search domain types corresponds to a type of one of the multiple search domains used to generate the first set of results. Alternatively, the search domain type may not correspond to a type of one of the multiple search domains used to generate the first set of results. Process 1000 ranks the search domain types using ranking scores at block 1008. In one embodiment, for each of the results in the second set of results, process 1000 computes a domain score based on the second set of results and domain types to determine which of the search domain types have higher ranked results. For example and in one embodiment, the second set of results includes results A, B, and C, where A scores highest, B scores in the middle, and C scores the lowest and A, B, C have domain type of media, wiki, and maps. In this example, the domain type scores would be highest for media, followed by wiki, and maps.

At block 1010, process 1000 ranks the first set of results using the ranked search domain types. In one embodiment, each of the results in the second set of results has a ranking score that is generated from the corresponding search domain. In this embodiment, process 1000 increases the ranking score for a result that corresponds to a search domain that has a higher ranked search domain type. Furthermore, process 1000 decreases the ranking score for a result that corresponds to a search domain that has a lower ranked search domain type. For example and in one embodiment, if for a query, the second set of results has results from the media search domain that score higher, maps search domain score medium, and the wiki search domain score lower, process 1000 would increase the ranking scores of results in the first set of results from the media search domain, decrease the ranking scores of results in the first set of results from the wiki search domain, and not adjust the ranking scores of results in the first set of results from the maps search domain.

Figure 11:
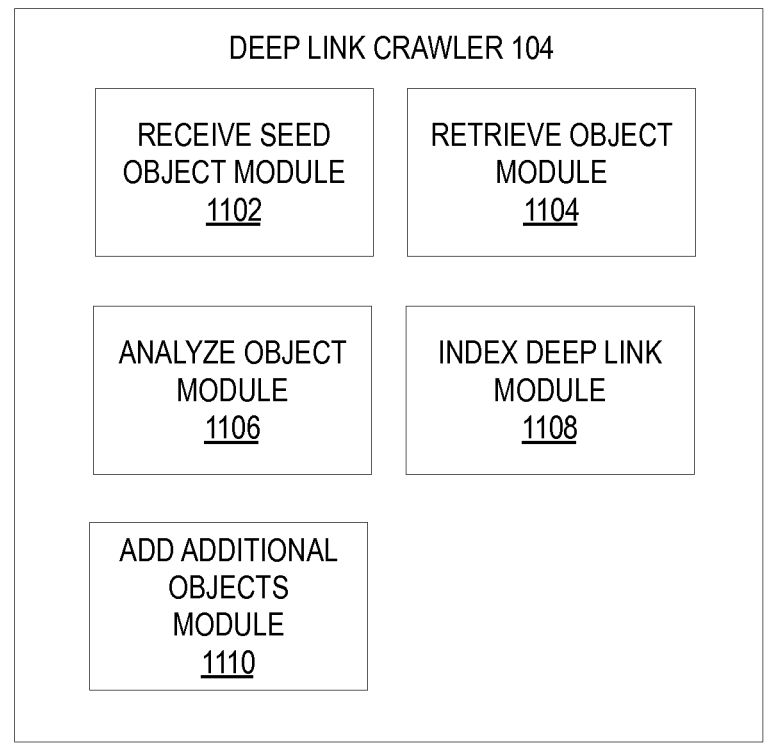
FIG. 11 is a block diagram of one embodiment of a deep link crawler that indexes deep links from multiple deep links.

FIG. 11 is a block diagram of one embodiment of a deep link crawler 104 that indexes deep links from multiple deep links. In one embodiment, the deep link crawler 104 includes a receive seed object module 1102, retrieve object module 1104, analyze object module 1106, index deep link module 1108, and add additional objects module 1110. The receive seed object module 1102 receive the references for the seed objects as described in FIG. 3, block 302 above. The retrieve object module 1104 retrieves the object as described in FIG. 3, block 308 above. The analyze object module 1106 analyze the object for deep links as described in FIG. 3, block 310 above. The index deep link module 1108 indexes the deep link as described in FIG. 3, block 314 above. The add additional objects module 1110 adds the references for the additional objects as described in FIG. 3, block 316 above.

Figure 12:
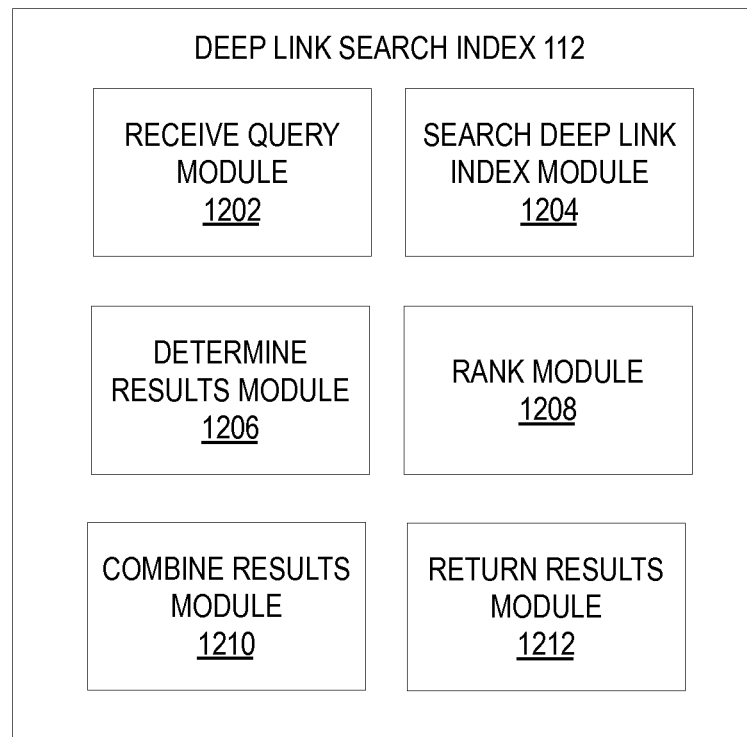
FIG. 12 is a block diagram of one embodiment of a deep link search service that performs a query search using a deep link index.

FIG. 12 is a block diagram of one embodiment of a deep link search service 112 that performs a query search using a deep link index. In one embodiment, the deep link search service 112 includes a receive query module 1202, search deep link index module 1204, determine results module 1206, rank module 1208, combine results module 1210, and return results module 1212. In one embodiment, the receive query module 1202 receives the query as described in FIG. 4, block 402 above. The search deep link index module 1204 searches the deep link index as described in FIG. 4, block 404 above. The query results module 1206 determines the set of results as described in FIG. 4, block 406 above. The rank results module 1208 ranks the results as described in FIG. 4, block 408 above. The combine results module 1210 combines the results form other search domains as described in FIG. 4, block 410 above. The return results module 1212 returns the results as described in FIG. 4, block 412 above.

Figure 13:
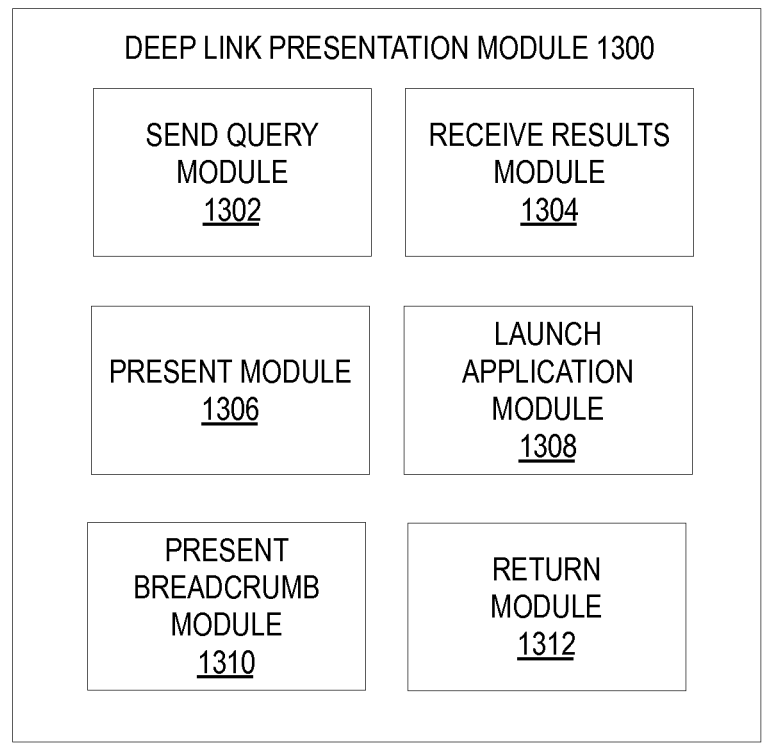
FIG. 13 is a block diagram of one embodiment of a deep link presentation module that receives and presents a deep link as part of a query result.

FIG. 13 is a block diagram of one embodiment of a deep link presentation module 1300 that receives and presents a deep link as part of a query result. In one embodiment, the deep link presentation module 1300 includes a send query module 1302, receive results module 1304, present results module 1306, launch application module 1308, present breadcrumb module 1310, and return module 1312. In one embodiment, the send query module 1302 sends the query as described in FIG. 5, block 502 above. The receive results module 1304 receive the set of results as described in FIG. 5, block 504 above. The present results module 1306 presents the results as described in FIG. 5, block 506 above. The launch application module 1308 launches the application as described in FIG. 5, block 508 above. The present breadcrumb module 1310 presents the breadcrumb user interface object as described in FIG. 5, block 510 above. The return module 1312 returns to the set of results as described in FIG. 5, block 512 above.

Figure 14:
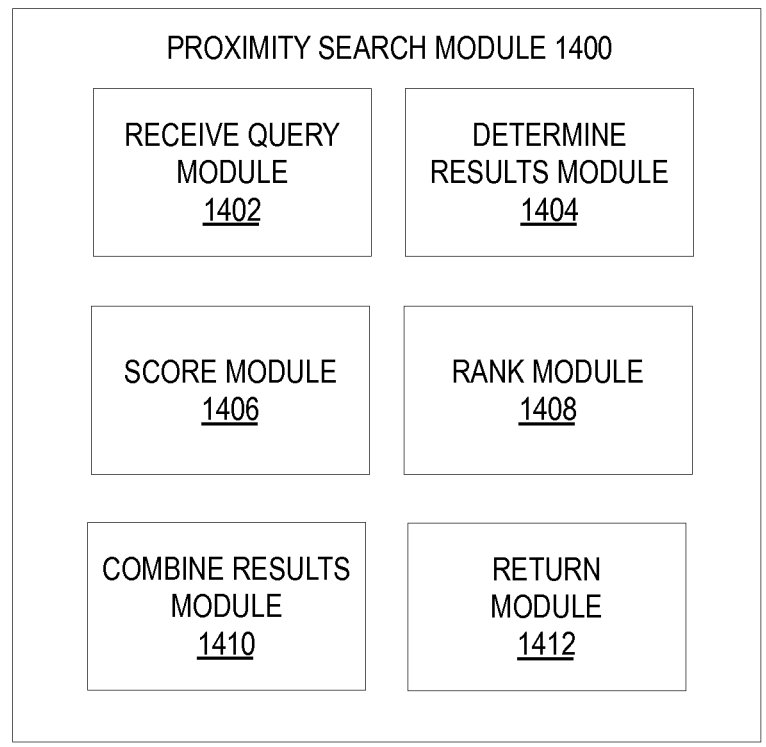
FIG. 14 is a block diagram of one embodiment of a proximity search module that performs a query search using a proximity scoring function.

FIG. 14 is a block diagram of one embodiment of a proximity search module 1400 that performs a query search using a proximity scoring function. In one embodiment, the proximity search module 1400 includes a receive query module 1402, determine results module 1404, score module 1406, rank module 1408, combine results module 1410, and return results module 1412. In one embodiment, the receive query module 1402 receives the query as described in FIG. 6, block 602 above. The query results module 1404 determines the set of results as described in FIG. 6, block 604 above. The score module 1406 scores the results using the proximity function as described in FIG. 6, block 606 above. The rank results module 1408 ranks the results as described in FIG. 6, block 608 above. The combine results module 1410 combines the results from other search domains as described in FIG. 6, block 610 above. The return results module 1412 returns the results as described in FIG. 6, block 612 above.

Figure 15:
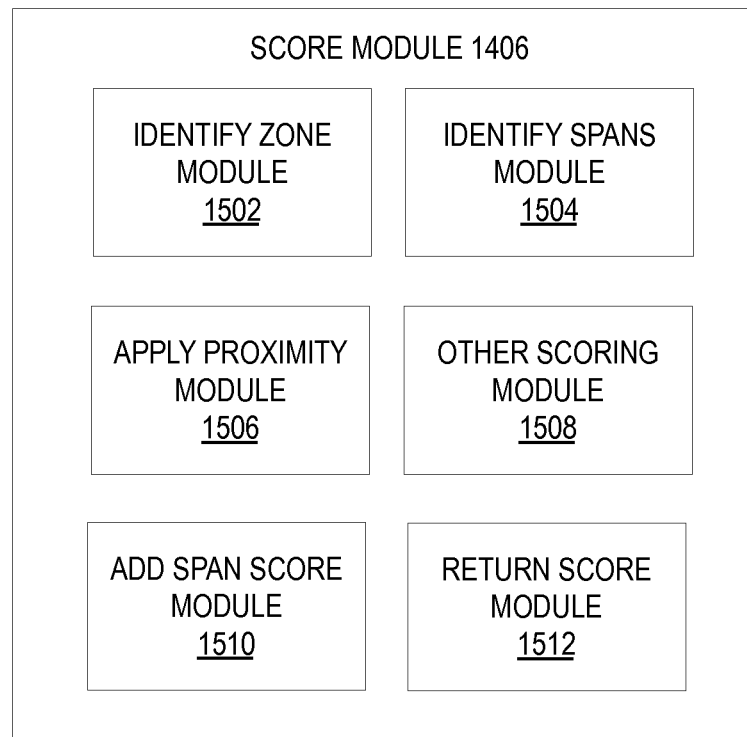
FIG. 15 is a block diagram of one embodiment of a scoring module that scores an object using an ordered quadratic proximity function.

FIG. 15 is a block diagram of one embodiment of a score module 1500 that scores an object using an ordered quadratic proximity function. In one embodiment, score module 1406 includes an identify zone module 1502, identify spans 1504, apply proximity module 1506, other scoring module 1508, add span score module 1510, and return score module 1512. In one embodiment, the identify zone module 1502 identifies the zone in the object as described in FIG. 7, block 704 above. The identify spans 1504 identifies the spans in the object as described in FIG. 7, block 708 above. The apply proximity module 1506 applies the proximity function as described in FIG. 7, block 712 above. The other scoring module 1508 applies other scoring functions to the object as described in FIG. 7, block 714 above. The add span score module 1510 adds the span score to the object score as described in FIG. 7, block 716 above. The return score module 1512 returns the object score as described in FIG. 7, block 720 above.

Figure 16:
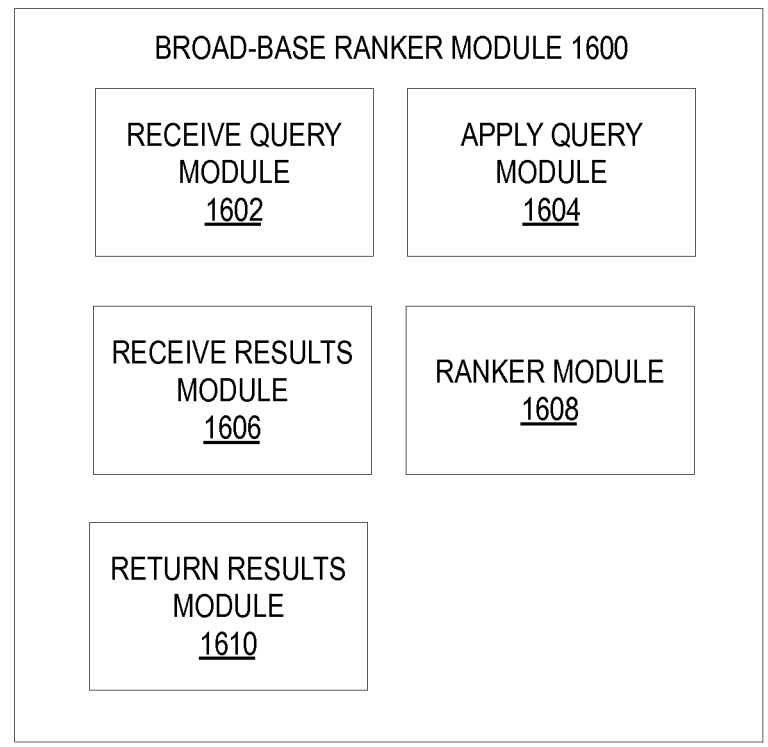
FIG. 16 is a block diagram of one embodiment of a broad-base ranker module that uses query results from a broad-base search domain to ranks query results from other search domains.

FIG. 16 is a block diagram of one embodiment of a broad-base ranker module 1600 that uses query results from a broad-base search domain to ranks query results from other search domains. In one embodiment, the broad-base ranker module 1600 includes a receive query module 1602, apply query module 1604, receive results module 1606, ranker module 1608, and return results module 1610. In one embodiment, the receive query module 1602 receives the query as described in FIG. 9, block 902 above. The apply query module 1604 applies the query to multiple search domains as described in FIG. 9, block 904 above. The receive results module 1606 receives the two sets of results as described in FIG. 9, block 906 above. The ranker module 1608 ranks the first set of results as described in FIG. 9, block 908 above. The return results module 1610 returns the ranked results as described in FIG. 9, block 910 above.

Figure 17:
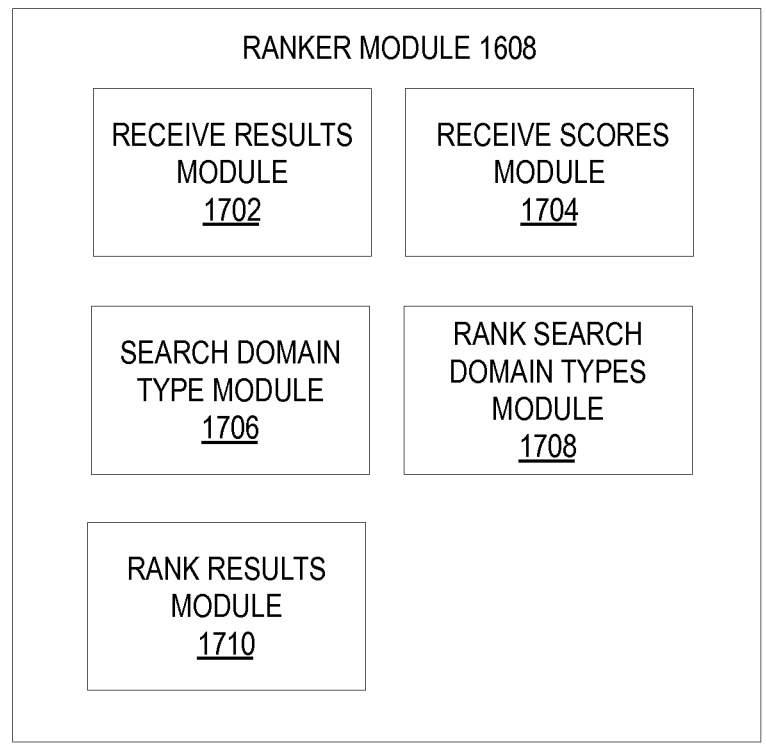
FIG. 17 is a block diagram of one embodiment of a ranker module that ranks types of broad-base search domain results and use the ranked broad-base types to rank results from other search domains.

FIG. 17 is a block diagram of one embodiment of a ranker module 1608 that ranks types of broad-base search domain results and use the ranked broad-base types to rank results from other search domains. In one embodiment, the ranker module 1608 includes a receive results module 1702, receive scores module 1704, search domain type module 1706, rank search domain types module 1708, and rank results 1710. In one embodiment, the receive results module 1702 receives the results as described in FIG. 10, block 1002 above. The receive scores module 1704 receives the scores as described in FIG. 10, block 1004 above. The search domain type module 1706 determines a search domain as described in FIG. 10, block 1006 above. The rank search domain types module 1708 ranks the search domain types as described in FIG. 10, block 1008 above. The rank results 1710 ranks the first set of results as described in FIG. 10, block 1010 above.

Embodiments described above have illustrated a first device receiving a query input, sending the query, receiving query results, and launching an application on the device. In alternate embodiments, the first device (e.g., a smartphone or another type of portable device) is coupled to a second portable device (e.g., a wearable device such as a smart watch or another type of wearable or portable device) through a personal area network, such as Bluetooth. In these embodiments, the second portable device can perform any of the above actions with regards to the fulfilling of the query search. For example and in one embodiment, the second portable device can receive the inputted query from a user by a variety of means (e.g., input text, gestures, voice, and/or another type of input), where the first device sends the query to the search service. Alternatively, the second device could display the query results, where the first device receives the query results and relays these results to the second device. In a further embodiment, a display and selection of a result can launch an application on the second device. If the application is not installed on the second device, this application can be downloaded and installed on the second prior to the application launch. For example and in one embodiment, a result can be displayed on either the first or second device and, upon selection of this result, an application is launched on the second device. Alternatively, the result can be displayed on the second device and launched on the first device.

As a further example and embodiment, a smartwatch is coupled to a smartphone via a Bluetooth connection. In this embodiment, either the smartphone or smartwatch receives a query input by a user. If the query is received on the smartwatch, the query is sent to the smartphone. The smartphone sends the query to the search service, which can be a local or remote search service. The smartphone receives the search results, where the results can be displayed on the smartphone, smartwatch, and/or a combination thereof. Upon selection of one of the results on either of the smartwatch or the smartphone, an application can be launched on the smartphone, smartwatch, and/or a combination thereof. If the application is not installed on the relevant device, the application can be downloaded and installed on that device prior to being launched.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select to not provide precise location information, but permit the transfer of location zone information.

Figure 18:
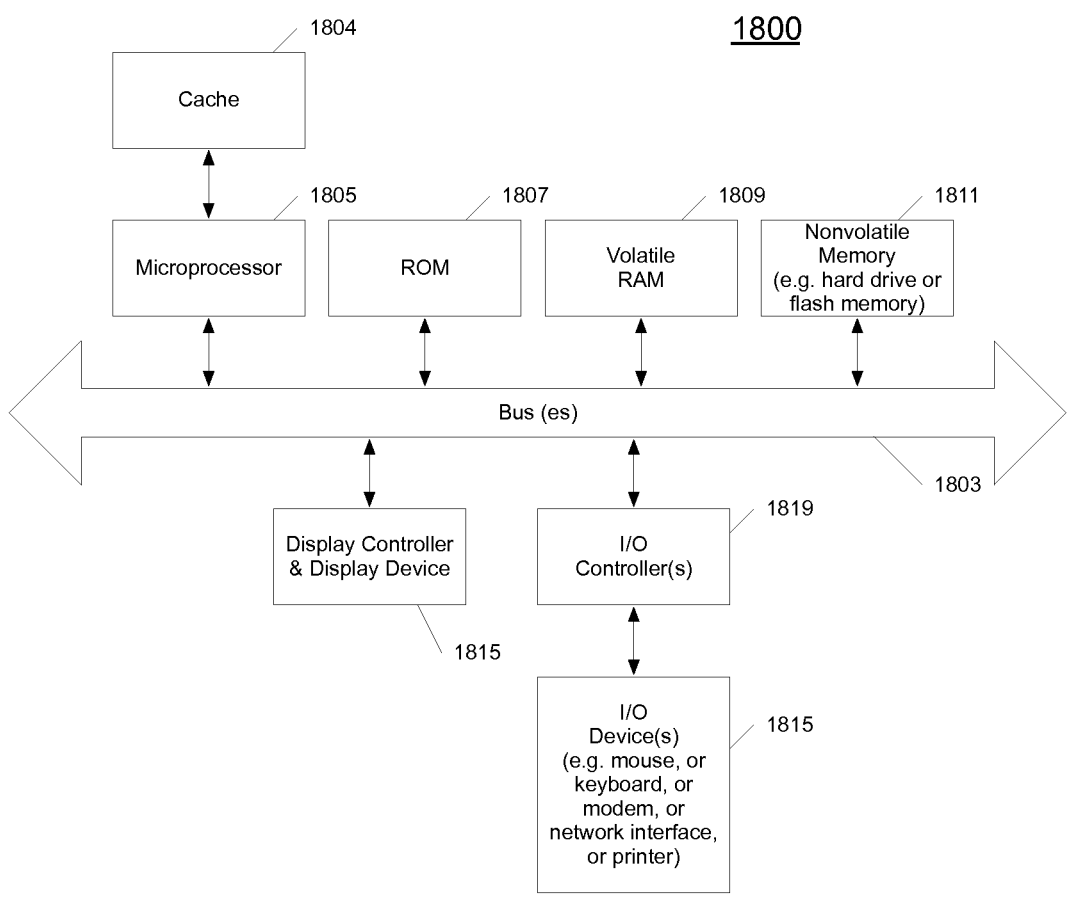
FIG. 18 illustrates one example of a typical computer system, which may be used in conjunction with the embodiments described herein.

FIG. 18 shows one example of a data processing system 1800, which may be used with one embodiment of the present invention. For example, the system 1800 may be implemented including a device 102 or search engine 110 as shown in FIG. 1. Note that while FIG. 18 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 18, the computer system 1800, which is a form of a data processing system, includes a bus 1803 which is coupled to a microprocessor(s) 1805 and a ROM (Read Only Memory) 1807 and volatile RAM 1809 and a non-volatile memory 1811. The microprocessor 1805 may include one or more CPU(s), GPU(s), a specialized processor, and/or a combination thereof. The microprocessor 1805 may retrieve the instructions from the memories 1807, 1809, 1811 and execute the instructions to perform operations described above. The bus 1803 interconnects these various components together and also interconnects these components 1805, 1807, 1809, and 1811 to a display controller and display device 1813 and to peripheral devices such as input/output (I/O) devices which may be mice, keyboards, modems, network interfaces, printers and other devices which are well known in the art. Typically, the input/output devices 1815 are coupled to the system through input/output controllers 1813. The volatile RAM (Random Access Memory) 1809 is typically implemented as dynamic RAM (DRAM), which requires power continually in order to refresh or maintain the data in the memory.

The mass storage 1811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1811 will also be a random access memory although this is not required. While FIG. 18 shows that the mass storage 1811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1803 may include one or more buses connected to each other through various bridges, controllers and/or adapters as is well known in the art.

Figure 19:
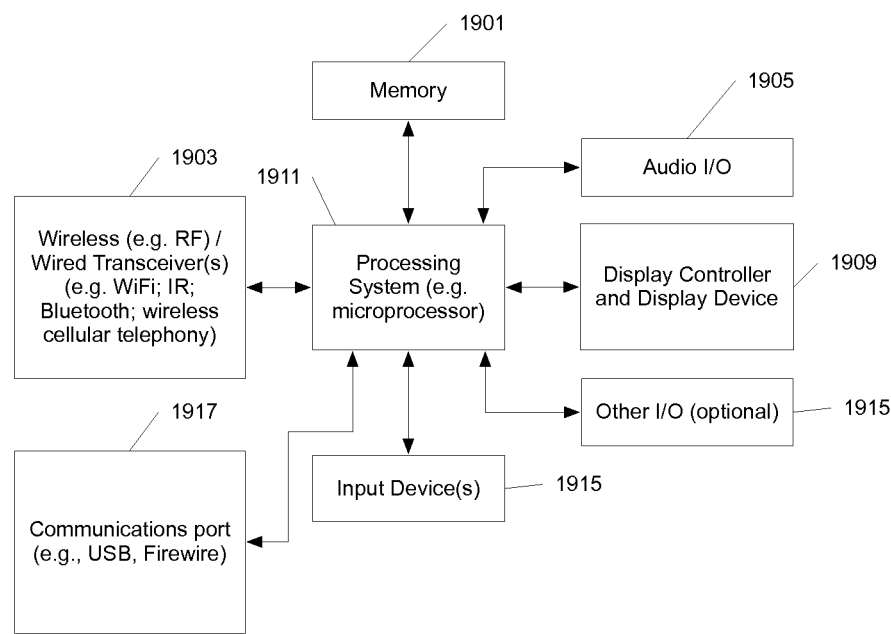
FIG. 19 shows an example of a data processing system, which may be used with one embodiment of the present invention.

FIG. 19 shows an example of another data processing system 1900 which may be used with one embodiment of the present invention. For example, system 1900 may be implemented as a device 100 as shown in FIG. 1. The data processing system 1900 shown in FIG. 19 includes a processing system 1911, which may be one or more microprocessors, or which may be a system on a chip integrated circuit, and the system also includes memory 1901 for storing data and programs for execution by the processing system. The system 1900 also includes an audio input/output subsystem 1905, which may include a microphone and a speaker for, for example, playing back music or providing telephone functionality through the speaker and microphone.

A display controller and display device 1909 provide a visual user interface for the user; this digital interface may include a graphical user interface which is similar to that shown on a Macintosh computer when running OS X operating system software, or Apple iPhone when running the iOS operating system, etc. The system 1900 also includes one or more wireless transceivers 1903 to communicate with another data processing system, such as the system 1900 of FIG. 19. A wireless transceiver may be a WLAN transceiver, an infrared transceiver, a Bluetooth transceiver, and/or a wireless cellular telephony transceiver. It will be appreciated that additional components, not shown, may also be part of the system 1900 in certain embodiments, and in certain embodiments fewer components than shown in FIG. 19 may also be used in a data processing system. The system 1900 further includes one or more communications ports 1917 to communicate with another data processing system, such as the system 1500 of FIG. 15. The communications port may be a USB port, Firewire port, Bluetooth interface, etc.

The data processing system 1900 also includes one or more input devices 1913, which are provided to allow a user to provide input to the system. These input devices may be a keypad or a keyboard or a touch panel or a multi touch panel. The data processing system 1900 also includes an optional input/output device 1915 which may be a connector for a dock. It will be appreciated that one or more buses, not shown, may be used to interconnect the various components as is well known in the art. The data processing system shown in FIG. 19 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1900 may be a network computer or an embedded processing device within another device, or other types of data processing systems, which have fewer components or perhaps more components than that shown in FIG. 19.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "presenting," "ranking," "receiving," "determining," "increasing," "decreasing," "sending," "launching," "adding," "scoring," "using," "boosting," "characterizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to rank a plurality of query results from a plurality of search domains, the method comprising:
   receiving a search query from a client;
   applying the search query to the plurality of specialized search domains and a broad-base search domain, wherein each of the specialized search domains has a specialized search domain type that is one of a plurality of specialized search domain types and a specialized search domain type is a characterization of that specialized search domain;
   receiving a plurality of specialized query results from the plurality of search domains and a set of broad-base query results from the broad-base search domain;
   determining a set of specialized search domain types for the set of broad-base specialized query results, wherein each of the set of specialized search domain types corresponds to one of the plurality of specialized search domain types;
   ranking the set of specialized search domain types using a set of ranking scores corresponding to the set of broad-based query results;
   ranking the plurality of specialized query results using at least the ranked set of specialized search domain types, wherein the ranking the plurality of specialized query results includes increasing a ranking score of one of the plurality of specialized query results from one of the plurality of specialized search domains that corresponds to a higher ranked specialized search domain type; and
   returning the ranked plurality of query results to the client.

2. The machine-readable medium of claim 1, wherein the characterizing further comprises:
   receiving a set of ranking scores from the broad-base search domain for the set of broad-base query results; and ranking the set of specialized search domain types using the set of ranking scores.

3. The machine-readable medium of claim 1, wherein the ranking comprises:
decreasing a ranking score of one of the plurality of specialized query results from one of the plurality of specialized search domains that corresponds to a lower ranked specialized search domain type.

4. The machine-readable medium of claim 1, wherein each of the plurality of specialized search domains is selected from the group consisting of maps search domain, media store search domain, online encyclopedia search domain, and sites search domain.

5. A method to rank a plurality of query results from a plurality of search domains, the method comprising:
receiving a search query from a client;
applying the search query to the plurality of specialized search domains and a broad-base search domain, wherein each of the specialized search domains has a specialized search domain type that is one of a plurality of specialized search domain types and a specialized search domain type is a characterization of that specialized search domain;
receiving the plurality of specialized query results from the plurality of search domains and a set of broad-base query results from the broad-base search domain;
determining a set of specialized search domain types for the set of specialized broad-base query results, wherein each of the set of specialized search domain types corresponds to one of the plurality of specialized search domain types;
ranking the set of specialized search domain types using a set of ranking scores corresponding to the set of broad-based query results;
ranking the plurality of specialized query results using at least the ranked set of specialized search domain types, wherein the ranking the plurality of specialized query results includes increasing a ranking score of one of the plurality of specialized query results from one of the plurality of specialized search domains that corresponds to a higher ranked specialized search domain type; and
returning the rank plurality of query results to the client.

6. The method of claim 5, wherein the characterizing comprises:
receiving a set of ranking scores from the broad-base search domain for the set of broad-base query results; and
ranking the set of specialized search domain types using the set of ranking scores.

7. The method of claim 5, wherein the ranking comprises:
decreasing a ranking score of one of the plurality of specialized query results from one of the plurality of specialized search domains that corresponds to a lower ranked specialized search domain type.

8. The method of claim 5, wherein each of the plurality of specialized search domains is selected from the group consisting of maps search domain, media store search domain, online encyclopedia search domain, and sites search domain.

9. A device to rank a plurality of query results from a plurality of search domains, the device comprising:
a processor;
a memory coupled to the processor though a bus; and
a process executed from the memory by the processor causes the processor to receive a search query from a client, apply the search query to the plurality of specialized search domains and a broad-base search domain, wherein each of the specialized search domains has a specialized search domain type that is one of a plurality of specialized search domain types and a specialized search domain type is a characterization of that specialized search domain, receive the plurality of specialized query results from the plurality of specialized search domains and a set of broad-base query results from the broad-base search domain, determine a set of specialized search domain types for the set of broad-base query results, wherein each of the set of specialized search domain types corresponds to one of the plurality of specialized search domain types, rank the broad-based types using a set of ranking scores corresponding to the set of broad-based query results, rank the plurality of specialized query results using at least the ranked broad-base types, and return the ranked plurality of query results to the client, wherein the ranking the plurality of specialized query results includes increasing a ranking score of one of the plurality of specialized query results from one of the plurality of specialized search domains that corresponds to a higher ranked specialized search domain type.

10. The device of claim 9, wherein the process further causes the processor to characterize by:
receiving a set of ranking scores from the broad-base search domain for the set of broad-base query results; and
ranking the set of specialized search domain types using the set of ranking scores.

11. The device of claim 9, wherein the process further causes the processor to rank by:
decreasing a ranking score of one of the plurality of specialized query results from one of the plurality of specialized search domains that corresponds to a lower ranked specialized search domain type.

12. The machine-readable medium of claim 1, wherein each of the specialized search domains types is selected from the group consisting of media, locations, encyclopedia, and sites.

13. The method of claim 5, wherein each of the specialized search domains types is selected from the group consisting of media, locations, encyclopedia, and sites.

14. The device of claim 9, wherein each of the specialized search domains types is selected from the group consisting of media, locations, encyclopedia, and sites.

* * * * *